(12) United States Patent
Doufas et al.

(10) Patent No.: US 11,846,371 B2
(45) Date of Patent: Dec. 19, 2023

(54) THERMOPLASTIC BLENDS AND COMPOSITES FOR FLEXIBLE PIPES

(71) Applicant: ExxonMobil Chemical Patents Inc., Baytown, TX (US)

(72) Inventors: Antonios K. Doufas, Houston, TX (US); Krishnan Anantha Narayana Iyer, Manvel, TX (US); Michael J. Goncy, Mont Belvieu, TX (US); Andrew A. Takacs, Houston, TX (US); Wanli Wang, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 197 days.

(21) Appl. No.: 17/278,564

(22) PCT Filed: Sep. 10, 2019

(86) PCT No.: PCT/US2019/050301
§ 371 (c)(1),
(2) Date: Mar. 22, 2021

(87) PCT Pub. No.: WO2020/068408
PCT Pub. Date: Apr. 2, 2020

(65) Prior Publication Data
US 2021/0356056 A1    Nov. 18, 2021

Related U.S. Application Data

(60) Provisional application No. 62/735,472, filed on Sep. 24, 2018.

(51) Int. Cl.
*F16L 11/08* (2006.01)
*C08L 23/12* (2006.01)
(Continued)

(52) U.S. Cl.
CPC ............ *F16L 11/083* (2013.01); *C08L 23/12* (2013.01); *F16L 59/143* (2013.01);
(Continued)

(58) Field of Classification Search
CPC ..... F16L 11/083; F16L 59/143; F16L 59/147; C08L 23/12; C08L 2201/14;
(Continued)

(56) References Cited

U.S. PATENT DOCUMENTS

| 3,687,169 A | 8/1972 | Reynard |
| 5,093,423 A * | 3/1992 | Bayan ................. C08L 9/06 525/95 |

(Continued)

FOREIGN PATENT DOCUMENTS

| EP | 889090 | 1/1999 |
| EP | 892831 | 5/2020 |

(Continued)

*Primary Examiner* — Craig M Schneider
*Assistant Examiner* — David R Deal

(57) ABSTRACT

A flexible conduit used for transportation of hydrocarbon fluids for off-shore and on-shore oil and gas applications includes an inner pressure sheath, at least one reinforcing layer at least partially disposed around the pressure sheath, an outer protective sheath at least partially disposed around the at least one reinforcing layer, and optionally a thermally insulating layer disposed between the at least one reinforcing layer and the outer protective sheath. At least one of the inner pressure sheath, outer protective sheath, and the thermally insulating layer is manufactured using a thermoplastic blend (TPB) composition. The TPB compositions disclosed herein are useful for the formation of at least one polymer layer of the thermoplastic umbilical hoses used for transportation of hydrocarbon fluids.

22 Claims, 1 Drawing Sheet

(51) Int. Cl.
*F16L 59/14* (2006.01)
*F16L 59/147* (2006.01)

(52) U.S. Cl.
CPC ......... *F16L 59/147* (2013.01); *C08L 2201/14* (2013.01); *C08L 2203/18* (2013.01); *C08L 2205/025* (2013.01); *C08L 2205/06* (2013.01); *C08L 2205/08* (2013.01)

(58) Field of Classification Search
CPC ........... C08L 2203/18; C08L 2205/025; C08L 2205/06; C08L 2205/08
USPC ........................................................ 138/137
See application file for complete search history.

(56) References Cited

U.S. PATENT DOCUMENTS

| | | | |
|---|---|---|---|
| 5,359,001 A | 10/1994 | Epple et al. | |
| 5,507,320 A * | 4/1996 | Plumley | F16L 11/125 |
| | | | 138/123 |
| 5,741,858 A | 4/1998 | Brann et al. | |
| 5,918,641 A | 7/1999 | Hardy et al. | |
| 6,123,114 A | 9/2000 | Seguin et al. | |
| 6,166,143 A | 12/2000 | Watanabe et al. | |
| 6,407,174 B1 | 6/2002 | Ouhadi | |
| 6,475,582 B1 * | 11/2002 | Phan | C08L 51/06 |
| | | | 428/36.9 |
| 6,615,878 B2 | 9/2003 | Dewimille et al. | |
| 6,679,298 B2 | 1/2004 | Espinasse | |
| 6,910,507 B2 | 6/2005 | Simon et al. | |
| 7,390,850 B2 | 6/2008 | Cook et al. | |
| 7,504,458 B2 | 3/2009 | Abraham et al. | |
| 7,829,009 B2 | 11/2010 | Procida | |
| 8,210,212 B2 | 7/2012 | Buchner | |
| 8,302,634 B2 | 11/2012 | Procida | |
| 8,338,543 B2 | 12/2012 | Moscardi et al. | |
| 8,389,615 B2 * | 3/2013 | Tse | C08L 23/10 |
| | | | 525/98 |
| 8,741,408 B2 | 6/2014 | Tronc et al. | |
| 9,090,019 B2 | 7/2015 | Sheldrake | |
| 9,422,424 B2 | 8/2016 | Roy et al. | |
| 9,745,461 B2 * | 8/2017 | Jacob | C08L 23/10 |
| 9,926,443 B2 * | 3/2018 | Li | C08L 23/16 |
| 10,364,308 B2 * | 7/2019 | Chen | C08F 110/06 |
| 10,513,601 B2 * | 12/2019 | Chen | C08L 23/16 |
| 10,920,053 B2 * | 2/2021 | Abubakar | C08L 23/12 |
| 2001/0021426 A1 | 9/2001 | Procida et al. | |
| 2004/0242779 A1 | 12/2004 | Cai et al. | |
| 2005/0186379 A1 | 8/2005 | Rhee et al. | |
| 2005/0221033 A1 | 10/2005 | Procida | |
| 2005/0229991 A1 | 10/2005 | Hardy et al. | |
| 2006/0014903 A1 | 1/2006 | Vromman | |
| 2006/0293453 A1 * | 12/2006 | Jiang | C08F 210/06 |
| | | | 525/191 |
| 2007/0021564 A1 | 1/2007 | Ellul et al. | |
| 2007/0213431 A1 * | 9/2007 | Adur | C08F 255/00 |
| | | | 524/588 |
| 2008/0776879 | 3/2008 | Resendes et al. | |
| 2011/0082258 A1 * | 4/2011 | Walton | C08F 297/083 |
| | | | 525/88 |
| 2011/0120583 A1 | 5/2011 | Coutarel et al. | |
| 2016/0326353 A1 | 10/2016 | Prades et al. | |
| 2017/0275443 A1 * | 9/2017 | Datta | C08L 23/14 |

FOREIGN PATENT DOCUMENTS

| | | |
|---|---|---|
| WO | 91/19924 | 12/1991 |
| WO | 2014/020052 | 2/2014 |

\* cited by examiner

THERMOPLASTIC BLENDS AND COMPOSITES FOR FLEXIBLE PIPES

PRIORITY

This application is a U.S. national phase application of PCT Application No. PCT/US2019/050301 having a filing date of Sep. 10, 2019, which claims priority to and the benefit of U.S. Provisional Application Ser. No. 62/735,472 having a filing date of Sep. 24, 2018, the contents of each of which are incorporated by reference in their entirety.

FIELD

This present disclosure relates to flexible conduits for transporting hydrocarbon fluids and particularly, but not exclusively, hydrocarbon fluids from offshore oil and gas production.

BACKGROUND

Flexible and metal conduits (e.g., risers, pipes, flow lines, tubes, hoses, and the like) used in the recovery of oil and gas resources are typically composites of a number of polymeric and metal components. For example, a typical flexible conduit/pipe for use in oil and gas production may have an inner pressure sheath through which the hydrocarbon-based fluid flows. The inner (pressure) sheath is often surrounded by one or more reinforcing layer/s. This may be one or more layers of helically-wound armoring wires. Armoring wires enable conduits to withstand pressure from the transported material as well as pressure from the outside environment (e.g., external pressure from water at the ocean floor) by resisting radial distortion/compression and axial force, torque, and pressure end-cap force. Reinforcing layers may also include, for example, one or more lamina or layers of a metal, a reinforced polymer (e.g., carbon nanotube reinforced polyvinylidene fluoride (PVDF)), and the like, and combinations thereof. Examples of internal tubular housings and reinforcing layers are described in U.S. Pat. No. 6,679, 298; 6,123,114; 3,687,169; and 9,090,019, incorporated herein by reference in their entirety. Reinforcing layer/s may be surrounded by an external protective layer. Often, there are one or more insulating layers between the inner sheath and external protective layer. The conduit should be strong and resistant to damage, as installation is often difficult (e.g., sea floors, underground) and long term usability is desirable. The properties of each component of the conduit should complement each other to promote long term usability.

The innermost layer, the pressure sheath, has direct contact with the material flowing inside (e.g., oil, gas). Thus, this layer may exhibit resistance to chemical and physical degradation by the transported material as well as impermeable to any gasses present within, as some gasses associated with oil/gas may contribute to corrosion of other layers. In some instances, the inner (or pressure) sheath is flexible and may be collapsible in a given direction under the action of external pressure greater than the internal pressure of the conduit. Increasing reliance on deep and ultra-deep water production environments, where ocean floor temperatures can be very low, leads to the added problem that cooling of transported fluids can lead to pipe blockage. For example, when transporting crude oil, blockage of the internal bore of a conduit can occur due to wax formation. Thus, it may be desirable that the pressure sheath have low thermal conductivity.

Preventing heat loss from the transported material may also be, and more commonly is, achieved with one or more separate insulating layers exhibiting low thermal conductivity.

In addition to low thermal conductivity, insulation layers may also advantageously exhibit high gas permeability. Despite attempts to minimize heat loss, imperfect thermal insulation may cause condensate to form within the inner layers of the conduit. Moisture may also accumulate due to damage to outer layers. In such instances, acid gasses such as carbon dioxide or hydrogen sulfide, originating from the transported material that managed to permeate the pressure sheath, may accumulate, react with this water, and create a corrosive environment for the layers within. Armoring wires, as they are typically made from metals such as stainless steel, are particularly sensitive to such corrosion. Thus, high gas permeability would allow gasses escaping the pressure sheath to be quickly expelled.

The external protective layer protects inner layers of the conduit from an external environment. Like the insulation layer, the outer sheath may also display low thermal conductivity as well as high gas permeability. Additionally, the outer sheath may exhibit resistance to corrosion (e.g., by marine environments), by UV light (e.g., the sun), and mechanical forces such as abrasion or tearing.

Materials commonly used in each of these aforementioned conduit layers have a variety of shortcomings. For example, often, the inner pressure sheath and/or external protective layer is a polyamide-based material (e.g., PA11 (or Nylon 11) or PA12 (Nylon 12)). However, polyamides are particularly prone to hydrolysis and the ensuing corrosion stemming therefrom, effectively limiting the overall lifespan of the conduit.

The insulation layer is often syntactic foam material, a polypropylene matrix filled with hollow glass spheres. However, the hollow glass spheres in the tape are prone to crushing. Over time, internal and external pressures on the conduit may reduce the thickness of the insulation layer (and thus also thermal insulation properties) due to this crushing. To avoid reduction of thermal insulation below a particular threshold, insulation layers are often fabricated thicker than initially required, increasing cost and weight of the conduit.

Alternatives are thus needed to overcome these realized deficiencies and improve the efficiency and increase the lifetime of conduits/pipes. It has now been found that certain uncured thermoplastic blend (TPB) compositions provide attractive alternatives to the current materials used for certain conduit/pipe components. The TPB compositions advantageously exhibit low thermal conductivity, enhanced durability, and gas permeability (e.g. $CO_2$, $H_2S$) may be tuned depending on the layer in which the TPB composition is included (e.g. high gas permeability is desirable in the outer sheath; low gas permeability/excellent barrier properties is desirable in the inner sheath). These properties allow sustained use during the entire lifetime of a conduit. Furthermore, more efficient materials allow thinner (e.g., reduced outer diameter) and lighter conduits to be made, reducing associated material costs.

SUMMARY OF THE INVENTION

This present disclosure relates to conduits for transporting hydrocarbon fluids and particularly, but not exclusively, hydrocarbon fluids from oil and gas production facilities. It has been surprisingly found that certain specific TPB composition compositions exhibit excellent properties for use as a thermal insulating layer, including where such layer additionally acts as an external protective layer (or outer sheath), an intermediate anti-wear layer, or an inner (pressure) layer/s of a conduit (in particular embodiments, a flexible conduit) for transporting hydrocarbon fluids.

In one aspect the present invention provides a flexible conduit useful in the production of hydrocarbon fluid.

In one embodiment, a flexible conduit contains the following components:
a) at least one pressure sheath;
b) at least one reinforcing layer; and
c) and an outer protective sheath.

Within the context of this embodiment, at least one of the pressure sheath and the outer protective sheath is fabricated from a TPB composition having: (i) a dispersed phase comprising uncured elastomer component, and (ii) a continuous phase comprising a thermoplastic component.

In another embodiment, the flexible conduit contains the following components:
a) at least one pressure sheath;
b) at least one reinforcing layer; and
c) a thermal insulating layer; and
d) an outer protective sheath.

Within the context of this embodiment, at least one of the pressure sheath, the insulating layer, and the outer protective sheath is fabricated from a TPB composition having: (i) a dispersed phase comprising uncured elastomer component, and (ii) a continuous phase comprising a thermoplastic component.

Within the context of either aforementioned embodiment, the uncured elastomer component may contain, for example, an olefinic elastomeric copolymer, a butyl rubber, natural rubber, acrylic rubber, nitrile rubber, ethyl vinyl acetate, polyisobutylene (PIB), or any combination thereof.

In some embodiments, the acrylic rubber is an acrylic acid-ester copolymer rubber. In some embodiments, the nitrile rubber is hydrogenated nitrile rubber, carboxylated nitrile rubber, or a combination thereof. In some embodiments, the uncured elastomer component comprises ethylene vinyl acetate rubber.

Examples of suitable butyl rubber include, but are not limited to, isobutylene-isoprene rubber (IIR), a bromoisobutylene-isoprene rubber (BIIR), a brominated isobutylene paramethyl-styrene terpolymer rubber (BIMSM), and any combination thereof.

In some embodiments, the thermoplastic component may contain, for example, ethylene-propylene diene monomer (EPDM) rubber, ethylene-propylene rubber, ethylene-based rubber, propylene-based rubber, or any combination thereof.

In some embodiments, the thermoplastic component contains a polymer of one or more olefin monomer having 2 to 7 carbon atoms. In some embodiments, said polymer comprises propylene or ethylene, or a mixture thereof. In some embodiments, the ethylene polymer is differentiated polyethylene copolymer, for example, ethylene-vinyl acetate, ethylene ethyl acrylate copolymer, ethylene methacrylate, ethylene butyl acrylate, and combinations thereof.

In some embodiments, the polymer is functionalized. In some embodiments, the polymer is functionalized with maleic anhydride. In some embodiments, the functionalized polymer is maleic anhydride functionalized polypropylene. In some embodiments, the functionalized polymer is maleic anhydride functionalized high density polyethylene.

In particularly useful embodiments, the functionalized polyolefin has a polarity less than 90 degrees.

Within the context of either aforementioned embodiment, the TPB composition may include from 5 wt. % to 50 wt. % of the dispersed phase and from 50 wt. % to 95 wt. % of the continuous phase, wherein wt. % is based on the combined weight of the elastomer and thermoplastic polymer within the TPB composition.

In some embodiments, a low thermal conductivity additive may be added to the TPB composition. Examples of suitable low thermal conductivity additives aerogels, fumed silica, and mixtures thereof.

In some embodiments, a cyclic olefin copolymer (COC) or hydrocarbon resin may be added to the TPB composition. In some embodiments, the COC contains norbornene and ethylene monomers. In some embodiments, the COC is present in a range from 1 wt. % to 10 wt. % based upon the total weight of the TPB composition.

In some embodiments, a compatibilizing agent may be added to the TPB composition, for example, in a range from 1 wt. % to 10 wt. % based upon the total weight of the TPB composition.

In some embodiments, a plasticizer may be added to the TPB composition, for example (but not limited to), paraffin oils, aromatic oils, naphthenic oils, synthetic oils, oligomeric plasticizers, or mixtures thereof.

In some embodiments, HDPE or UHMWPE may be added to the TPB composition.

In some embodiments, at least one filler may be added to the TPB composition, for example (but not limited to) carbon fibers, graphite, carbon nanotubes, glass fibers, or aramid fibers.

In some embodiments of the present invention, conduit layers fabricated from TPB compositions disclosed herein may exhibit one or more of the following properties when measured by methods in Table 1:
a) a thermal conductivity in the range from about 0.10 to about 0.30 W/mK;
b) an abrasion resistance of less than 100 mg/1000 cycle; and
c) a $CO_2$ gas permeability of 10 barrers or more.

In some embodiments, conduit layers fabricated from TPB compositions disclosed herein may have a $CO_2$ gas permeability of 20 barrers or more as measured by the methods disclosed in Table 1.

In some embodiments, conduit layers fabricated from TPB compositions disclosed herein may have a $CO_2$ gas permeability of 0.1 barrers to 8 barrers as measured by the methods disclosed in Table 1.

In some embodiments, conduit layers fabricated from TPB compositions disclosed herein may have a hardness in the range of 60 Shore A to 60 Shore D as measured using ASTM D2240.

Flexible conduits disclosed herein may be made by a fabrication process that includes, but is not limited to, extrusion, co-extrusion, blow molding, injection molding, thermo-forming, elasto-welding, compression molding, 3D printing, pultrusion, or any combination thereof.

Pressure sheath, insulating layer, and outer protective sheaths may have a wall thickness of between 0.5 mm and 50 mm and may be fabricated and have properties in accordance with at least one of API Spec 17J, API Spec 17K, or DNV RP F119.

In some embodiments, the flexible conduit may be an unbonded flexible pipe.

In particular applications, the flexible conduit is a subsea composite pipe for the conveyance of fluid and has a pipe wall fabricated from a composite material that contains a TPB composition which includes: (i) a dispersed phase comprising uncured elastomer component and (ii) a continuous phase comprising a thermoplastic component and (iii) a plurality of reinforcing fibers selected from the group consisting of carbon fibers, graphite, carbon nanotubes, glass fibers and aramid fibers, wherein the plurality of fibers is embedded within the TPB composition.

DETAILED DESCRIPTION OF THE INVENTION

Figure 1:
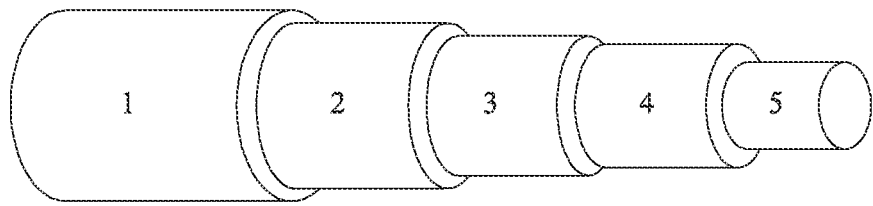
FIG. 1 is a cross-sectional view of a conduit according to one or more embodiments of the present disclosure.

Thermoplastic elastomer (TPE, sometimes also called thermoplastic rubbers) compositions, as known in the art, are mixtures of polymeric materials having a fraction of a thermoplastic, a fraction of rubber, and often but not always, a filler, and have both thermoplastic and elastomeric components and properties. TPE materials may be formed in a variety of ways. As will be further discussed herein, the TPE compositions disclosed herein, which are hereafter referred to as thermoplastic blends (TPB) may be formed in the absence of a chemical curing agent, for example, by mixing a thermoplastic polymer with an elastomeric polymer in the presence of heat and/or high shear conditions, and in the absence of any chemical crosslinking agent. The usability of TPB compositions for fabrication of the inner pressure, insulation, and outer sheaths is particularly advantageous, as no crosslinking is required for the rubber phase. In addition, lack of crosslinking leads to advantageously simpler manufacturing process for the compositions and the pipes as well as relatively low material cost compared to use of chemically crosslinked/cured thermoplastic compositions, also known in the art as thermoplastic vulcanizates (TPV).

TPB compositions disclosed herein include an elastomer or rubber which has not been intentionally exposed to a curative agent. As used herein, "uncured" and "non-crosslinked" are defined as having not been subjected to vulcanization or a method of chemical cross-linking, including UV-initiated cross-linking. Excluded from this term are exposure to processes relating to application of thermal heat, deformation (shear and/or extensional), and/or pressure.

The TPB compositions disclosed herein, having uncured (non-crosslinked) rubber/elastomer components, may be provided in the form of a raw material pellet. Such pellets may additionally include additives, such as (but not limited to) pigments, fillers, processing, and/or dispersing aids. The components of the TPB composition and any additional additives may be melt-compositioned or compounded in an extruder (e.g., a single- or twin-screw extruder) and pelletized to form the raw material TPB pellets. The pellets may then be processed to form sheaths or tapes that may be used for any of the polymeric layers of a flexible conduit as described herein. Alternatively, the TPB composition can be made in-situ during the fabrication process of making the flexible conduit/pipe or individual layer of the flexible conduit/pipe, e.g. in a twin or single screw extruder where the composition components and formulation additives are fed and mixed and the composition is plasticized to form the desired layer or pipe structure.

The present invention now will be described more fully hereinafter with reference to the accompanying examples and experiments, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Various terms as used herein are defined below. To the extent a term used in a claim is not defined below, it should be given the broadest definition persons in the pertinent art have given that term as reflected in one or more printed publications or issued patents.

Well-known functions or constructions may not be described in detail for brevity and/or clarity. The terminology used herein is for the purpose of describing particular embodiments only and is not intended to be limiting of the invention. As used herein, the singular forms "a," "an," and "the" are intended to include the plural forms as well, unless the context clearly indicates otherwise. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

One or more illustrative embodiments incorporating the embodiments of the present disclosure are included and presented herein. Not all features of a physical implementation are necessarily described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related, and other constraints, which vary by implementation and from time to time. While a developer's efforts might be time-consuming, such efforts would be, nevertheless, a routine undertaking for those of ordinary skill in the art and having benefit of this disclosure.

Unless otherwise indicated, all numbers expressing quantities of ingredients, properties such as physical properties, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques. Where the term "less than about" or "more than about" is used herein, the quantity being modified includes said quantity, thereby encompassing values "equal to." That is, "less than about 3.5%" includes the value 3.5%. As used herein, the term "about" is meant to include the recited value plus or minus 10% of said value.

Unless explicitly stated otherwise, all wt. % values represent a mass percent based on the combined weight of the dispersed elastomer (or rubber) and continuous phase thermoplastic in the TPB composition, excluding additives. Unless explicitly stated otherwise, "phr" is given the common meaning in the art, is parts per hundred rubber and is based on only the rubber/elastomer component.

When numerical lower limits and numerical upper limits are listed herein, ranges from any lower limit to any upper limit are contemplated, whether or not explicitly listed.

While compositions and methods are described herein in terms of "comprising" various components or steps, the compositions and methods can also "consist essentially of" or "consist of" the various components and steps.

All priority documents, patents, publications, and patent applications, test procedures (such as ASTM methods), and other documents cited herein are fully incorporated by reference to the extent such disclosure is not inconsistent with this disclosure and for all jurisdictions in which such incorporation is permitted.

This present disclosure relates generally to conduits for transporting hydrocarbon fluids (and associated fluids). In particularly useful embodiments, the conduits are flexible conduits. In particular applications, the conduits may be used to transport hydrocarbon fluids from oil and gas production facilities, for example, for transporting fluids between oil and gas reservoirs and offshore platforms for separation of oil, gas, and water components. It has been found that certain specific TPB compositions, in particular, those including uncured rubber/elastomer components, advantageously exhibit excellent properties for use as in conduits for transporting hydrocarbon fluids, including for use as pressure (inner) sheaths, insulation layers, and outer sheaths, including pipe structures where the insulating layer(s) additionally act(s) as an external protective layer.

In the present disclosure, the terms "conduits," "pipes," "hoses," "tubes," and the like may be used interchangeably. Additionally, the terms "housing," "sheath," and "layer" may be used interchangeably in the practice of the present invention. Such conduits have at least a) a pressure sheath (interchangeably called "inner layer", "inner sheath", or "inner housing") which, during fluid transport, is in contact with the transport fluids and b) an external protective sheath (interchangeably called "outer layer", "outer sheath"). Often, conduits have additional layers, such as one or more reinforcing layer/s (to give structure and strength to the conduit) and/or one or more thermally insulating layer/s (interchangeably called simply "insulating layer"). The outer layer may be fully or partially disposed around such internal layer/s (which include, but are not limited to, reinforcing layer/s, insulating layer/s, and pressure sheath).

Thermoplastic Blend (TPB) Compositions

In one aspect, the present disclosure provides a thermoplastic blend (TPB) composition having a thermoplastic polymer phase and an uncured elastomer phase. In some embodiments, the thermoplastic polymer phase is a polar thermoplastic. In other embodiments, the thermoplastic polymer phase contains a polyolefin or an olefin-based polymer. Such compositions may be useful in constructing various conduit/pipe layers, particularly for application in transporting oil and gas.

Disclosed herein are compositions having a fraction of a thermoplastic polymer and a fraction of an uncured rubber/elastomer. These may be "compositions," "mixtures," or "compositions," and the terms are used interchangeably. The composition includes any mixture having both thermoplastic and uncured rubber components, including initial mixtures formed in a manufacturing process, intermediate products (such as pellets), or a final product (such as a sheath, layer, or tape).

As used herein and except as stated otherwise, the term "copolymer," and grammatical variants thereof, refers to a polymer derived from two or more monomers (e.g., terpolymers, tetrapolymers, and the like).

As used herein, the term "thermoplastic blend" (also referred to herein as "TPB"), and grammatical variants thereof, is broadly defined as any material that has at least (i) a dispersed phase including at least one uncured elastomer and (ii) a continuous phase including at least one thermoplastic component. A TPB composition may further include other ingredients or additives. The term "composition" may also be used interchangeably with the term "composition," "mixture," or "material."

TPB compositions may include a continuous phase containing a polymeric thermoplastic component from about 50 wt. % to about 95 wt. %, encompassing any value therebetween, including 60 wt. % to about 90 wt. %, or from about 65 wt. % to about 85 wt. %, or from about 70 wt. % to about 80 wt. %, or from about 72 wt. % to about 78 wt. %. TPB compositions additionally include a dispersed phase containing an uncured rubber or elastomeric component, present from 5 wt. % to 50 wt. %, encompassing any value therebetween 10 wt. % to about 40 wt. %, or from about 15 wt. % to about 35 wt. %, or from about 20 wt. % to about 30 wt. %, or from about 22 wt. % to about 28 wt. %.

Various properties of several embodiments of TPB compositions having the components and prepared as described herein were measured using methods commonly used in the art. Unless otherwise stated, methods used to test each property are those as disclosed in Table 1. When compared to materials commonly used for the various layers of the flexible conduit systems discussed herein, the TPB compositions disclosed herein may, in some embodiments, exhibit equal or enhanced gas permeability, abrasion resistance, and creep resistance. Using additives, properties, such as thermal conductivity and hardness, may also be tuned. In general, using TPB compositions disclosed herein, the following properties of said TPB composition or material prepared therefrom may be achievable:

Elastomeric/Rubber Component

The elastomeric/rubber component of TPB compositions described herein may be any material that is considered by persons skilled in the art to be a "rubber" and/or "elastomer." The terms "elastomer" and "rubber" are used interchangeably.

In one or more embodiments, the elastomer may include isobutylene-based rubbers, ethylene-based rubbers, propylene-based rubbers, ethylene-propylene rubbers, ethylene propylene diene monomer rubber, acrylic rubbers, nitrile rubber, natural rubber, or any combination thereof.

Examples of suitable isobutylene-based rubbers include, but are not limited to, homopolymers of isobutylene (e.g., PIB) as well as copolymers of isobutylene with other monomers, such as a $C_4$ to $C_7$ multiolefin monomer (e.g., isoprene or paramethyl-styrene). Optionally, the rubber/elastomer may be halogenated. Specific examples of suitable isobutylene-based rubbers include, but are not limited to, butyl rubber (IIR, copolymer of isobutylene and isoprene), brominated isobutylene/isoprene (BIIR), brominated isobutylene paramethyl-styrene terpolymers (BIMSM), and polyisobutylene. Useful forms of polyisobutylene include, but are not limited to, oligomeric form, polymeric form, and combinations thereof and may be sourced as liquid, solid bale, semi-solid, pellet form, or combinations thereof.

Brominated isobutylene paramethyl-styrene terpolymers are commercially available, for example, from ExxonMobil Chemical Company under the trade name EXXPRO™ specialty elastomers; butyl and halogenated butyl polymers commercially available from ExxonMobil Chemical Company under the trade names EXXON™ Bromobutyl 2244, EXXON™ Bromobutyl 2255, and EXXON™ Butyl 268; and brominated isobutylene-isoprene copolymer is commercially available, for example, from Arlanxeo Holding B.V. under the trade names Brominated X_BUTYL™ and Regular X_BUTYL™.

Ethylene-based rubbers include, but are not limited to, copolymers of ethylene with higher α-olefins, for example (but not limited to), 1-butene, 1-propylene, 1-octene, 1-hexene, 4-methyl-1-pentene 1-decene, or combinations thereof. Examples of suitable commercially available ethylene-based rubbers include ENGAGE™ (available from the Dow Chemical Company, Midland, MI) and EXACT™ (available from ExxonMobil Chemical, Houston, TX). Propylene-based rubbers include copolymers of ethylene with higher α-olefins, for example (but not limited to), butane or octane. Examples of suitable commercially available propylene-based rubbers include VERSIFY™ (available from the Dow Chemical Company, Midland, MI) and VISTAMAXX™ (available from ExxonMobil Chemical, Houston, TX).

Ethylene-propylene rubbers include, but are not limited to rubbery copolymers polymerized from ethylene and propylene, and optionally diene. Ethylene-propylene rubbers (EPM) rubbers and ethylene-propylene diene (EPDM) rubbers may include from about 40 wt. % to about 85 wt. %, from about 50 wt. % to about 70 wt. %, or from about 60 wt. % to about 66 wt. % of units derived from ethylene, based on the total combined weight of ethylene and propylene in the rubber, including any value and subset therebetween. EPDM rubbers may contain from about 0.1 wt. % to about 15 wt. %, from about 0.5 wt. % to about 12 wt. %, from about 1 wt. % to about 1 wt. %, or from about 2 wt. % to about 8 wt. % of units derived from diene monomer based on the total combined weight of ethylene, In one or more embodiments, where the diene includes 5-ethylidene-2-norbonene, the ethylene-propylene rubber may include at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-ethylidene-2-norbornene based on the total combined weight of ethylene, propylene, and diene monomers in the rubber, including any value and subset therebetween. In one or more embodiments, where the diene includes 5-vinyl-2-norbornene, the ethylene-propylene rubber may include at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-vinyl-2-norbornene based on the total combined weight of ethylene, propylene, and diene monomers in the rubber, including any value and subset therebetween.

Suitable EPM and EPDM rubbers may have a weight average molecular weight (Mw) in the range of 100,000 g/mole to 1,200,000 g/mole, encompassing any value and subset therebetween. The Mw may be greater than 100,000 g/mole, or greater than 200,000 g/mole, or greater than 400,000 g/mole, or greater than 600,000 g/mole. Preferably, the Mw of the ethylene-propylene rubber is less than 1,200,000 g/mole, or less than 1,000,000 g/mole, or less than 900,000 g/mole, or less than 800,000 g/mole.

Suitable EPM and EPDM rubbers may have a number average molecular weight ($M_n$) in the range of 20,000 g/mole to 500,000 g/mole, encompassing any value and subset therebetween. The $M_n$ may be greater than 20,000 g/mole, or greater than 60,000 g/mole, or greater than 100,000 g/mole, or greater than 150,000 g/mole, encompassing any value and subset therebetween. The $M_n$ of the ethylene-propylene rubbers may be less than 500,000 g/mole, or less than 400,000 g/mole, or less than 300,000 g/mole, or less than 250,000 g/mole.

Techniques for determining the molecular weight ($M_n$, $M_w$, and $M_z$) and molecular weight distribution (MWD) may be found in U.S. Pat. No. 4,540,753, which is incorporated by reference herein in its entirety, and in Macromolecules, 1988, volume 21, page 3360, by Verstrate et al. with a polystyrene standard, which is also herein incorporated by reference in its entirety.

In some embodiments, suitable EPM and EPDM rubbers include, but are not limited to, those characterized by having a Mooney viscosity ($ML_{(1+4)}$ at 125° C.) per ASTM D-1646, of from about 10 to about 500 or from about 50 to about 450, encompassing any value and subset therebetween.

In some embodiments, suitable EPM and EPDM rubbers include, but are not limited to, those characterized by having an intrinsic viscosity, as measured in decalin at 135° C. per ASTM D-1601, of from about 1 to about 8 deciliters per gram (dl/g), or from about 3 dl/g to about 7 dl/g, or from about 4 dl/g to about 6.5 dl/g, encompassing any value and subset therebetween.

In some embodiments, suitable EPM and EPDM rubbers include, but are not limited to those, characterized by a glass transition temperature ($T_g$), as determined by differential scanning calorimetry (DSC) according to ASTM E-1356 with a heating/cooling rate of 10° C./minute, that is less than −20° C., less than −30° C., less than −50° C., or from about −20° C. to about −60° C.

Suitable EPM and EPDM rubbers may be manufactured or synthesized by using a variety of techniques. For example, they may be synthesized by employing solution, slurry, or gas phase polymerization techniques that employ various catalyst systems. Exemplary catalysts include, but are not limited to, Ziegler-Natta systems such as those including vanadium catalysts, and single-site catalysts including constrained geometry catalysts involving Group IV-VI metallocenes.

Examples of suitable EPDM rubbers include, but are not limited to, rubbery copolymers polymerized from ethylene, propylene, and at least one diene monomer. The diene monomers may include, but are not limited to, 5-ethylidene-2-norbornene (ENB), 5-vinyl-2-norbornene (VNB), divinylbenzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene or combinations thereof. In certain embodiments, the diene monomers include sterically unhindered non-conjugated carbon-carbon double bonds such as ENB or VNB.

Examples of ethylene propylene diene monomer rubber that may be available commercially include VISTALON™ (available from ExxonMobil Chemical Company, Houston, TX), KELTAN™ (available from Lanxess Corporation, Pittsburgh, PA), NORDEL™ IP (available from Dow Chemical Company, Midland, MI), NORDEL™ MG (available from Dow Chemical Company, Midland, MI), ROYALENE™ (available from Lion Elastomers, Geismar, LA) and BUNA™ (available from Lanxess Corporation, Pittsburgh, PA).

In some embodiments, the rubber is a nitrile rubber, such as an acrylonitrile copolymer rubber. One example of a suitable nitrile rubber includes those containing polymers of 1,3-butadiene and acrylonitrile. In particular embodiments, the nitrile rubber includes a polymer of 1,3-butadiene and about 20 wt. % to about 50 wt. % acrylonitrile based on the total weight of the nitrile rubber. In particular embodiments, the nitrile rubbers include "solid" rubbers having a weight average molecular weight ($M_w$) of at least 50,000. In some embodiments, the $M_w$ is from about 100,000 to about 1,000,000. Commercially available nitrile rubbers suitable use in the present TPB compositions are described in Rubber World Blue Book, 1980 Edition, Materials and Compounding Ingredients for Rubber, pages 386-406.

In particularly useful embodiments, the rubber or elastomer is butyl rubber, brominated isobutylene/isoprene (BIIR), brominated isobutylene paramethyl-styrene terpolymers (BIMSM), or polyisobutylene (PIB). In those embodiments using PIB, it may be particularly useful to use said material in solid, bales, semi-solid, or pellet (masterbatch) form.

Thermoplastic Polymer Component

As used herein, the terms "thermoplastic polymer", "thermoplastic phase," "thermoplastic component," or "thermoplastic polymer" and grammatical variants thereof refers to any material that is not a "rubber" and that is a polymer or polymer composition considered by persons skilled in the art as being thermoplastic in nature (e.g., a polymer that softens when exposed to heat and returns to its original condition when cooled to room temperature). Each such term may be used interchangeably herein.

The thermoplastic component may include, for example, thermoplastic polymers that are solid, generally high molecular weight plastic resins. Exemplary thermoplastic polymers include, but are not limited to, crystalline, semi-crystalline, and crystallizable polyolefins, olefin homo and copolymers, and the like, and any combination thereof.

In one or more embodiments, the thermoplastic component may include one or more polar thermoplastic polymers, for example, a polyester, a polyimide, a polyketone, polymers of α-methylstyrene, poly(methyl methacrylate), polycarbonate, or any combination thereof.

In one or more embodiments, the thermoplastic component may include one or more polyolefins, including polyolefin homopolymers and polyolefin copolymers. In one or more embodiments, the polyolefin thermoplastic component is a homopolymer of an olefin monomer having 2 to 7 carbon atoms. In one or more embodiments, the polyolefin thermoplastic component is a copolymer of an olefin monomer having 2 to 7 carbon atoms or a copolymer prepared from olefin monomers having 2 to 7 carbon atoms with a (meth)acrylate monomer or a vinyl acetate monomer. For example, in some embodiments, the thermoplastic component may be a polymer or copolymer of ethylene, propylene, or higher α-olefins such is 1-butene, isobutylene, 1-pentene, 1-hexene, 1-octene, 2-methyl-1-propene, 3-methyl-1-pentene, 4-methyl-1-pentene, 5-methyl-1-hexene, or any combination thereof.

Within the context of this disclosure, propylene-based polymers may be semi-crystalline polymers. These polymers may be characterized by a crystallinity of at least 25% by weight, or at least 55% by weight, or at least 65%, or at least 70% by weight of said polymer. Crystallinity may be determined by dividing the heat of fusion of a sample by the heat of fusion of a 100% crystalline polymer, which is assumed to be 290 joules/gram (J/g) for polypropylene.

In one or more embodiments, the propylene-based polymers may be characterized by a heat of fusion ($H_f$) of at least 52.3 J/g, or in excess of 100 J/g, or in excess of 125 J/g, or in excess of 140 J/g. In some embodiments, the propylene-based polymers may be characterized by an $H_f$ in the range of 52.3 J/g and 290 J/g, encompassing any value and subset therebetween.

In one or more embodiments, useful propylene-based polymers may have a melt mass-flow rate (MFR) as determined by ASTM D-1238, 2.16 kg@230° C. in the range of 100 grams per 10 minutes (g/10 min) to 0.1 g/10 min, encompassing any value and subset therebetween. For example, the propylene-based polymers may have a MFR of less than 100 g/10 min, or less than 50 g/10 min, or less than 10 g/10 min, or less than 5 g/10 min. In some embodiments, the propylene-based polymers can have a MFR of at least 0.1 g/10 min, or 0.2 g/10 min, or at least 0.5 g/10 min. In a preferred embodiment, the propylene-based polymer has a MFR of between 3 g/10 min to 0.5 g/10 min.

In one or more embodiments, useful propylene-based polymers can have a melt temperature (Tm) that is from about 110° C. to about 170° C., or from about 140° C. to about 168° C., or from about 160° C. to about 165° C., encompassing any value and subset therebetween. They may have a glass transition temperature ($T_g$) of from about −10° C. to about 10° C., from about −3° C. to about 5° C., or from about 0° C. to about 2° C., encompassing any value and subset therebetween. In one or more embodiments, they may have a crystallization temperature ($T_c$) of at least about 75° C., or at least about 95° C., or at least about 100° C., or at least 105° C., or ranging from 105° C. to 130° C., encompassing any value and subset therebetween.

The propylene-based thermoplastic component may have a $M_w$ in the range of 50,000 g/mole to 1,000,000 g/mole, encompassing any value and subset therebetween. This includes a $M_w$ of 80,000 g/mole to 1,000,000 g/mole, 100,000 g/mole to 1,000,000 g/mole, 200,000 g/mole to 1,000,000 g/mole, 300,000 g/mole to 1,000,000 g/mole, 50,000 g/mole to 500,000 g/mole, 50,000 g/mole to 400,000 g/mole, 50,000 g/mole to 300,000 g/mole, and 50,000 g/mole to 250,000 g/mole.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In certain embodiments, at least 75%, at least 90%, at least 95%, or at least 97%, including up to 100%, of the units of the propylene-based polymer derive from the polymerization of propylene. In some embodiments, these polymers include homopolymers of propylene ("polypropylene"). As used herein, the term "polypropylene," and grammatical variants thereof, broadly means any polymer that is considered a "polypropylene" by persons skilled in the art (as reflected in at least one patent or publication), and includes, but is not limited to, homo, impact, and random polymers of propylene.

Examples of suitable propylene-based thermoplastic polymers for use in the embodiments of the TPB compositions described herein include EXXONMOBIL™ PP5341 (available from ExxonMobil Chemical Company); ACHIEVE™ PP6282NE1 (available from ExxonMobil Chemical Company); BRASKEM™ F008F (available from Braskem, Philadelphia, PA); and/or polypropylene resins with broad molecular weight distributions as described in U.S. Pat. Nos. 9,453,093 and 9,464,178, the entireties of which are incorporated herein by reference; and/or other polypropylene resins described in U.S. Pat. Pub. Nos. 2018/0016414 and 2018/0051160 (e.g., PDH025 with a melt flow rate of 2.6 g/10 min, as shown in the Table below), the entireties of which are incorporated herein by reference; WAYMAX™ MFX6 (a polypropylene homopolymer having a melt flow rate of 0.8 g/10 min, available from Japan Polypropylene Corporation, Tokyo, Japan); DAPLOY™ WB140 (available from Borealis AG, Vienna, Austria); and AMPLEO™ 1025MA and AMPLEO™ 1020GA (available from Braskem, Philadelphia, PA); and/or other suitable polypropylenes; and any combination thereof.

In some embodiments, the propylene-based polymers include a homopolymer of a high-crystallinity isotactic or syndiotactic polypropylene. Such polypropylene may have a density of from about 0.89 to about 0.91 g/cc, with the largely isotactic polypropylene having a density of from about 0.90 to about 0.91 g/cc, encompassing any value and subset therebetween. In some embodiments, the thermoplastic component is a high melt strength (HMS) thermoplastic propylene, such as a high melt strength polypropylene (HMS-PP) and/or a high melt strength long chain branched polypropylene (HMS LCB-PP). In some embodiments, alone or in combination with any other thermoplastic compound, the thermoplastic propylene may be a polypropylene fractional melt flow homopolymer ("fractional PP"). In some embodiments, the plastic phase contains a random copolymer or impact copolymer polypropylene, or combinations thereof.

In one or more embodiments, useful polypropylene can have a melt mass-flow rate (MFR) as determined by ASTM D-1238, 2.16 kg@230° C. in the range of 50 grams per 10 minutes (g/10 min) to 0.1 g/10 min, encompassing any value and subset therebetween, including 8 g/10 min, 6 g/10 min, 4 g/10 min, 2 g/10 min, and 0.5 g/10 min. This includes propylene-based polymers having a MFR of less than 10 g/10 min, less than 5 g/10 min, less than 1 g/10 min, and less than 0.5 g/10 min. In a preferred embodiment, the polypropylene has a MFR of between 3 g/10 min to 0.5 g/10 min.

In one or more embodiments, useful polypropylene has a molecular weight ($M_w$) of between about 100,000 g/mole and 1,000,000 g/mole. In particular embodiments, the polypropylene has a $M_w$ of 300,000 g/mole to 800,000 g/mole. Techniques for determining the molecular weight may be found in U.S. Pat. No. 4,540,753, which is incorporated by reference herein in its entirety, and in Macromolecules, 1988, volume 21, page 3360, by Verstrate et al. with a polystyrene standard, which is also herein incorporated by reference in its entirety.

In some embodiments, the thermoplastic component includes, alone or in addition to a polypropylene resin, a polyethylene resin. In one or more embodiments, this polyethylene resin includes at least 90%, at least 95%, and at least 99%, including 100%, of polymeric units derive from ethylene. In one or more embodiments, this polyethylene resin is a polyethylene homopolymer.

In one or more embodiments, the polyethylene used alone or in conjunction with the polypropylene may be characterized by having a $M_w$ of from about 50 to 10000 kg/mole, from about 100 to 5000 kg/mole, or from about 150 to 350 kg/mole, encompassing any value and subset therebetween. This polyethylene may be characterized by having a polydispersity index ($M_w/M_n$) that is between about 2 and about 20. This includes a polydispersity index of about 2 to 15, 2 to 10, 2 to 9, 3 to 20, 5 to 20, and 10 to 20.

In one or more embodiments, the polyethylene used alone or in conjunction with the polypropylene may be characterized by having a melt flow index (MFI) from 0.1 g/10 min to 50 g/10 min, or from 0.4 g/10 min to 12 g/10 min, or from 0.5 g/10 min to 10 g/10 min, per ASTM D-1238 at 190° C. and 2.16 kg load, encompassing any value and subset therebetween.

In one or more embodiments, the polyethylene used alone or in conjunction with the polypropylene may be characterized by an intrinsic viscosity as determined per ASTM D 1601 and D 4020 that is from 0.5 dl/g to 50 dl/g, from 1.0 dl/g to 9.0 dl/g, or from 1.5 dl/g to 8.0 dl/g, encompassing any value and subset therebetween.

In one or more embodiments, the polyethylene used alone or in conjunction with the polypropylene resin may be characterized by a density as measured per ASTM D4883 that is greater than 0.8 g/cc, or greater than 0.85 g/cc, or greater than 0.8 g/cc, or greater than 0.93 g/cc, or greater than 0.94 g/cc, or greater than 0.95 g/cc. In some embodiments, the polyethylene used alone or in conjunction with the polypropylene resin may be characterized by a density as measured per ASTM D4883 that is from 0.8 g/cc to 1.0 g/cc, encompassing any value and subset therebetween. In one or more embodiments, the polyethylene used alone or in conjunction with the polypropylene may be characterized by an intrinsic viscosity as determined per ASTM D 1601 and D 4020 that is from 0.5 dl/g to 50 dl/g, or from 1.0 dl/g to 9.0 dl/g, or from 1.5 dl/g to 8.0 dl/g, encompassing any value and subset therebetween.

Polymers useful as the polyethylene used alone or in conjunction with the polypropylene are preferably high density polyethylene resins. In some embodiments the HDPE has a density of from about 0.9 g/cm$^3$ to about 0.96 g/cm$^3$. Example of suitable high density polyethylene resins include those commercially available under the tradenames HDPE HD7960.13, HD7800P, HD9830, HD6706.17, PAXON™ AD60-007 (all available from ExxonMobil Chemical Company, Houston, TX).

Additives

The TPB compositions described herein may include any or all of the optional additives described hereinbelow. The term "additive" and grammatical variants thereof, includes any component of the TPB of the present disclosure that is not the elastomeric component or the thermoplastic component. Examples of suitable additives include, but are not limited to, plasticizers (including additive oils), fillers (e.g., particulate fillers), compatibilizers, thermoplastic modifiers, lubricants, antioxidants, antiblocking agents, stabilizers, anti-degradants, anti-static agents, waxes, foaming agents, pigments, processing aids, adhesives, tackifiers, wax, discontinuous fibers (such as world cellulose fibers), and any combination thereof.

Various plasticizers may be included in the TPB compositions of the present disclosure. A "plasticizer" and grammatical variants thereof, refers to a compound, typically a solvent, added to produce or promote plasticity and flexibility and reduce brittleness. Examples of suitable plasticizers include, but are not limited to paraffin oils, aromatic oils, naphthenic oils, synthetic oils, oligomeric plasticizers, and the like, and any combination thereof. The term "plasticizer" is used interchangeably with the term "oil" in the present disclosure. Examples of suitable synthetic oils include, but are not limited to, polyisobutylene (PIB), poly (isobutylene-co-butene), polylinear α-olefins, poly-branched α-olefins, hydrogenated polyalphaolefins, and the like, and any combination thereof. Synthetic polyalphaolefins are also suitable plasticizers. In some embodiments, the synthetic oils may include synthetic polymers or copolymers having a viscosity of about 20 centipoise (cP) or more, such as about 100 cP or more or about 190 cP or more, encompassing any value and subset therebetween, where the viscosity is measured by a Brookfield viscometer according to ASTM D-4402 at 38° C. In these or other embodiments, the viscosity of these oils can be about 4,000 cP or less, such as about 1,000 cP or less, encompassing any value and subset therebetween.

Oligomeric plasticizers may also be used as a plasticizer in the embodiments described herein. Examples of suitable oligomeric plasticizers include, but are not limited to, copolymers of isobutylene and butane, copolymers of butadiene together with a complementary comonomer, isobutylene, high molecular weight copolymers of isobutylene, polyisobutylene in solid or liquid form, and any combination thereof. These oligomeric plasticizers may have a $M_n$ of less than 1,000. Suitable commercially available oligomeric plasticizers include, for example, oligomeric copolymers of isobutylene and butene under the tradenames POLYBUTENE™ (available from Soltex, Inc.; Houston, TX), INDOPOL™ (available from BP PLC, London, England), and PARAPOL™ (ExxonMobil Chemical Company, Houston, TX); and oligomeric copolymers including butadiene commercially under the tradename RICON™ Resin (available from Ricon Resins, Inc., Grand Junction, CO).

In some embodiments, the TPB compositions may include an oil such as a mineral oil, a synthetic oil, or a combination thereof. These oils may also be referred to as plasticizers herein (also known in the art as extenders. Mineral oils may include aromatic, naphthenic, paraffinic, and isoparaffinic oils, synthetic oils, and combinations thereof. In some embodiments, the mineral oils may be treated or untreated. Useful mineral oils can be obtained under the tradename SUNPAR™ (available from Sun Chemicals, Parsippany-Troy Hills, NJ). Others commercially available oils include PARALUX™ and PARAMOUNT™ (both available from Chevron, San Ramon, CA). Other oils that may be used include hydrocarbon oils, such as organic esters and synthetic plasticizers. Many oils are derived from petroleum fractions, and have particular ASTM designations depending on whether they fall into the class of paraffinic, naphthenic, or aromatic oils. Other types of oils include alpha olefinic synthetic oils, such as liquid polybutylene. Oils other than petroleum based oils can also be used, such as oils derived from coal tar and pine tar, as well as synthetic oils, such as polyolefin materials.

Examples of oils include base stocks. According to the American Petroleum Institute (API) classifications, base stocks are categorized in five groups based on their saturated hydrocarbon content, sulfur level, and viscosity index (Table A). Lube base stocks are typically produced in large scale from non-renewable petroleum sources. Group I, II, and III base stocks are all derived from crude oil via extensive processing, such as solvent extraction, solvent or catalytic dewaxing, and hydroisomerization, hydrocracking and isodewaxing, isodewaxing and hydrofinishing ["New Lubes Plants Use State-of-the-Art Hydrodewaxing Technology" in Oil & Gas Journal, Sep. 1, 1997; Krishna et al., "Next Generation Isodewaxing and Hydrofinishing Technology for Production of High Quality Base Oils", 2002 NPRA Lubricants and Waxes Meeting, Nov. 14-15, 2002; Gedeon and Yenni, "Use of "Clean" Paraffinic Processing Oils to Improve TPE Properties", Presented at TPEs 2000 Philadelphia, P A., Sep. 27-28, 1999].

Group III base stocks can also be produced from synthetic hydrocarbon liquids obtained from natural gas, coal, or other fossil resources. Group IV base stocks are polyalphaolefins (PAOs), and are produced by oligomerization of alpha olefins, such as 1-decene. Group V base stocks include all base stocks that do not belong to Groups I-IV, such as naphthenics, polyalkylene glycols (PAG), and esters. Characteristics of Groups I-V are provided in Table A.

TABLE A

| | API Classification | | | | |
|---|---|---|---|---|---|
| | Group I | Group II | Group III | Group IV | Group V |
| % Saturates | <90 | ≥90 | ≥90 | Polyalpha-olefins (PAOs) | All others not belonging to Groups I-IV |
| % S | >0.03 | ≤0.03 | ≤0.03 | | |
| Viscosity Index (VI) | 80-120 | 80-120 | ≥120 | | |

In some embodiments, synthetic oils include polymers and oligomers of butenes, including isobutene, 1-butene, 2-butene, butadiene, and mixtures thereof. In some embodiments, these oligomers can be characterized by a number average molecular weight ($M_n$) of from about 300 g/mol to about 9,000 g/mol, and in other embodiments from about 700 g/mol to about 1,300 g/mol. In some embodiments, these oligomers include isobutenyl monomer units. Exemplary synthetic oils include, but are not limited to, polyisobutylene, poly(isobutylene-co-butene), and mixtures thereof. In some embodiments, synthetic oils may include polylinear α-olefins, poly-branched α-olefins, hydrogenated polyalphaolefins, and mixtures thereof.

In some embodiments, the synthetic oils include synthetic polymers or copolymers having a viscosity of about 20 cP or more, such as about 100 cP or more, such as about 190 cP or more, where the viscosity is measured by a Brookfield viscometer according to ASTM D-4402 at 38° C. In these or other embodiments, the viscosity of suitable oils can be about 4,000 cP or less, such as about 1,000 cP or less.

Useful synthetic oils can are commercially available under the tradenames SOLTEX™ polybutenes (available from Soltex, Houston, TX); INDOPOL™ polybutenes (available from Ineos, League City, TX); SPECTRASYN™ white synthetic oils (available from ExxonMobil) (formerly SHF Fluids); ELEVAST™ hydrocarbon fluids (available from ExxonMobil); RISELLA™ white oils produced based on gas to liquid technology (available from Shell Global, The Hague, Netherlands) (e.g., RISELLA™ X 415/420/430); PRIMOL™ white oils (available from ExxonMobil) (e.g., PRIMOL™ 352/382/542); MARCOL™ white oils (available from ExxonMobil) (e.g., MARCOL™ 82/52); and DRAKEOL® white oils (available from Penreco, Karns City, PA (e.g., DRAKEOL® 34). Oils described in U.S. Pat. No. 5,936,028 may also be employed, the entirety of which is incorporated herein by reference in its entirety. Any combinations of the aforementioned oils may additionally be used, without departing from the scope of the present disclosure.

Other oils (i.e., plasticizers) may include polymeric processing additives, such as polymeric resins that have a very high melt flow index. These polymeric resins include both linear and branched molecules that have a melt flow rate that is greater than about 500 g/10 min, or greater than about 750 g/10 min, or greater than about 1000 g/10 min, or greater than about 1200 g/10 min, or greater than about 1500 g/10 min. Typically, these polymeric resins have a melt flow rate that is less than 10,000 g/10 min. Mixtures of various branched or various linear polymeric processing additives, as well as mixtures of both linear and branched polymeric processing additives may be used. In particularly useful embodiments, polypropylene homopolymers or propylene-ethylene copolymers are used as plasticizers.

In some embodiments, the plasticizer is included in an amount of less than 20 wt. %, such as in the range of 0.1 wt.

% to 20 wt. % of the TPB composition (including additives), encompassing any value and subset therebetween. In some embodiments, the plasticizer is present in an amount of between 1 wt. % and 10 wt. % of the TPB composition. In some embodiments, the plasticizer may be present from 20 phr to 150 phr, or 50 phr to 150 phr, encompassing any value and subset therebetween.

Optionally, hydrocarbon resins may be included in a TPB composition as an alternative to oil. In some embodiments the hydrocarbon resin may also affect gas permeability and lower thermal conductivity. Examples of suitable hydrocarbon resins include those produced from petroleum-derived hydrocarbons and monomers of feedstock including tall oil and other polyterpene or resin sources. Hydrocarbon resins may be included in the TPB composition in the range of about 0.1 wt. % to about 20 wt. %, which includes 1 wt. % to 15 wt. %, 1 wt. % to 10 wt. %, and 1 wt. % to 5 wt. %.

The terms "hydrocarbon resin" or "resin molecule" are interchangeable as used herein. Hydrocarbon resins are generally derived from petroleum streams, and may be hydrogenated or non-hydrogenated resins. The hydrocarbon resins may be polar or non-polar. Such hydrocarbon resins may include substituted or unsubstituted units derived from cyclopentadiene homopolymer or copolymers, dicyclopentadiene homopolymer or copolymers, terpene homopolymer or copolymer, pinene homopolymer or copolymers, $C_5$ fraction homopolymer or copolymer, $C_9$ fraction homopolymer or copolymers, alpha-methylstyrene homo or copolymers, and combinations thereof. Examples of hydrocarbon resins include aliphatic hydrocarbon resins such as resins resulting from the polymerization of monomers consisting of olefins and diolefins (e.g., ESCOREZ™ and OPPERA™ available from ExxonMobil Chemical Company of Houston, TX or PICCOTAC™ 1095 (available from Eastman Chemical Company of Kingsport, TN) and the hydrogenated derivatives thereof: alicyclic petroleum hydrocarbon resins and the hydrogenated derivatives thereof (e.g. ESCOREZ™ 5300 and 5400 series available from ExxonMobil Chemical Company or EASTOTAC™ resins from Eastman Chemical Company). Other exemplary useful resins useful include, but are not limited to, the hydrogenated cyclic hydrocarbon resins (e.g. REGALREZ® and REGALITE™ resins, both available from Eastman Chemical Company). In some embodiments, the resin has a Ring and Ball (R&B) softening point equal to or greater than 80° C. The R&B softening point can be measured by the method described in ASTM E28, which is incorporated herein by reference.

In particularly useful embodiments, suitable hydrocarbon resins have a $T_g$ (as determined by DSC according to ASTM E 1356) that is in a range from 10° C. to 190° C. when measured at 10° C./min. In some embodiments, the $T_g$ is in a range from 60° C. to 160° C. In some embodiments, suitable hydrocarbon resins have MFR (tested using ASTM D-1238; 2.16 kg@230° C.) that is in a range from 1 ml/10 min to 60 ml/10 min at 260° C., 2.16 kg. In some embodiments, the melt flow rate is in a range from 4 ml/10 min to 50 ml/10 min at 260° C., 2.16 kg.

One or more fillers may be included in the TPB composition. A "filler" or "particulate filler," and grammatical variants thereof, may be included in the TPB compositions of the present disclosure to reduce materials costs and/or enhance various properties thereof, such as durability, color (i.e., act as a pigment), and the like, and any combination thereof. The fillers may accordingly be reinforcing or non-reinforcing fillers. Suitable fillers include, but are not limited to, zeolites, talcum powder, calcium carbonate, clays, silica, talc, and any combination thereof.

The filler(s) may be included in an amount of from 0 wt. % to 30 wt. % of the TPB composition (including additives), encompassing any value and subset therebetween. In some embodiments, the TPB composition does not include a filler. In some embodiments, the filler may be present in an amount of from 0 phr to 100 phr, 1 phr to 100 phr, 0 phr to 40 phr, 1 phr to 40 phr, or 5 phr to 20 phr, encompassing any value and subset therebetween. In some embodiments, such as for use in as a thermally insulating layer, the TPB lend may contain filler from 3 phr to 10 phr, or less, encompassing any value and subset therebetween. In some embodiments, such as when the TPB composition is used to fabricate an outer protective layer, the TPB composition may contain filler in the range of 20 phr to 40 phr, encompassing any value and subset therebetween. It is to be understood that an amount within the full range (i.e., 0 phr to 100 phr) may be incorporated into the TPB composition, such as when the TPB composition is fabricated into a layer that will as both an outer protective layer and a thermally insulating layer.

One or more slip agents may be included in the TPB composition. A "slip agent" and grammatical variants thereof may be included in the TPB composition to enhance processability of the composition during manufacture, for example to reduce the coefficient of friction of a polyolefin and reduce adhesion to processing equipment. Useful slip agents include siloxanes-based materials, for example, high molecular weight siloxane polymer dispersed in polypropylene homopolymer (e.g., HMB-0221, (available from Dow Corning of Midland, MI). Other useful slip agents include ultra-high molecular weight polyethylenes (UHMWPE), molybdenum disulfide molybdenum disulfide, halogenated and nonhalogenated compounds based on aliphatic fatty chains, fluorinated polymers, perfluorinated polymers (such as KYNAR™ (available from Arkema of King of Prussia, PA), DYNAMAE™ (available from 3M of Saint Paul, MN)), graphite, and combinations thereof. Slip agents may be of the migratory or non-migratory type. In some embodiments, the slip agent is a non-migratory type.

In some embodiments, the polysiloxane-based slip agent includes a migratory siloxane polymer which is a liquid at standard conditions of pressure and temperature. In some embodiments, the polysiloxane-based slip agent is a high molecular weight, essentially linear polydimethyl-siloxane (PDMS). The polysiloxane-based slip agent may have a viscosity at room temperature in a range from about 100 to about 100,000 cSt, such as from about 1,000 to about 10,000 cSt or from about 5,000 cSt to about 10,000 cSt. In some embodiments, the polysiloxane-based slip agent is a non-migratory polysiloxane, incorporated into the TPB composition at an amount ranging from about 0.1 wt. % to about 20 wt. %, or from about 0.2 wt. % to about 15 wt. % or from about 0.2 wt. % to about 10 wt. % based on the total weight of the TPB composition (including additives).

In some embodiments, the polysiloxane includes a migratory siloxane polymer which is a liquid at standard conditions of pressure and temperature. A suitable polysiloxane is a high molecular weight, essentially linear polydimethyl-siloxane (PDMS). Additionally, the polysiloxane may have a viscosity at room temperature in a range from about 100 to about 100,000 cSt, such as from about 1,000 to about 10,000 cSt or from about 5,000 cSt to about 10,000 cSt.

In certain embodiments polysiloxane also contains R groups that are selected based on the cure mechanism desired for the composition containing the first polysiloxane. Typically, the cure mechanism is either by means of condensation cure or addition cure, but is generally via an addition cure process. For condensation reactions, two or more R groups per molecule should be hydroxyl or hydrolysable groups such as alkoxy group having up to 3 carbon atoms. For addition reactions, two or more R groups per molecule may be unsaturated organic groups, typically alkenyl or alkynyl groups, preferably having up to 8 carbon atoms. One suitable commercially available material useful as the first polysiloxane is XIAMETER® PMX-200 Silicone Fluid (available from Dow Corning of Midland, MI). In certain embodiments, the TPB compositions described herein contain polysiloxane in a range from about 0.2 wt. % to about 20 wt. %, such as from about 0.5 wt. % to about 15 wt. % or from about 0.5 wt. % to about 10 wt. % based on the total weight of the TPB composition (including additives).

In certain embodiments, polysiloxane, such as polyorganosiloxanes, includes a non-migratory polysiloxane which is bonded to a thermoplastic material. The polysiloxane is reactively dispersed in a thermoplastic material, which may be any homopolymer or copolymer of ethylene and/or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. In one embodiment, the thermoplastic material is a polypropylene homopolymer. In some embodiments, the polysiloxane may include predominantly D and/or T units and contain some alkenyl functionalities. In some embodiments, the reaction product of polysiloxane and the polypropylene has a number average molecular weight in a range from about 0.2 kg/mol to about 100 kg g/mole. The number average molecular weight of the reaction product of the polyorganosiloxane and the polymer matrix is at least 1.1 times, preferably at least 1.3 times, the number average molecular weight of the base polyorganosiloxane. In some embodiments, the second polyorganosiloxane has a gum loading of in a range from about 20 wt. % and about 50 wt. %.

Suitable methods of reactively bonding a polysiloxane to an organic thermoplastic polymer, such as a polyolefin, are disclosed in International Patent Publication Nos. WO2015/132190 and WO2015/150218, the entire contents of which are incorporated herein by reference for U.S. patent practice.

The slip agent(s) may be included in an amount of from 0.5 wt. % to 15 wt. %, or 0.5 wt. % to 10%, or 1 wt. % to 10%, or 1 wt. % to 5 wt. % of the TPB composition (including additives), encompassing any value and subset therebetween. In some embodiments, the slip agent(s) is present in an amount of between 0.1 wt. % and 20 wt. % of the TPB composition (including additives). Slip agents may be incorporated in any form, for example, in oil, paste, or powder form. One of skill in the art would readily recognize suitable slip agents useful in a TPB composition.

In some embodiments, the TPB composition includes one or more ultrahigh molecular weight polyethylenes ("UHMWPE") as a slip agent. UHMWPE is a polyethylene polymer that contains primarily ethylene-derived units. In some embodiments, the UHMWPE is a homopolymer of ethylene. In other embodiments, the UHMWPE is a copolymer of ethylene and an α-olefin such as 1-butene, 1-pentene, 1-hexene, 1-octene, 1-decene, 1-dodecene, 4-methyl-1-pentene, or 3-methyl-1-pentene. UHMWPE may have a weight average molecular weight of about 1,500,000 g/mol or greater, about 1,750,000 g/mol or greater, about 1,850,000 g/mol or greater, or about 1,900,000 g/mol or greater. Commercially available examples of UHMWPE include MIPELON™ XM-220, MIPELON™ XM-330 (both available from Mitsui Chemical of Tokyo, Japan), Ticona GUR® 4170 (available from Celanese of Dallas, TX), UTEC3040 (available from Braskem of Philadelphia, PA), LUBMER™ 5000, and LUBMER™ 5220 (both available from Mitsui Chemical of Tokyo, Japan).

In some embodiments, the UHMWPE may be in a powder or pellet form. The UHMWPE may have an average particle diameter of about 75 μm or less, about 70 μm or less, or about 65 μm or less. The UHMWPE may have an average particle diameter of 10 μm or greater, 15 μm or greater, 20 μm or greater, or 25 μm greater. In some embodiments, the UHMWPE may have an average particle diameter in a range from about 40 μm to about 75 μm, such as from about 50 μm to about 70 μm or from about 55 μm to 65 μm. In some embodiments, the UHMWPE may have an average particle diameter in a range from about 10 μm to about 50 μm, such as from about 15 μm to about 45 μm, from about 20 μm to about 40 μm, or from about 25 μm to about 30 μm.

In some embodiments, the UHMWPE is present in an amount in a range from about 1 wt. % to about 40 wt. %, which includes about 5 wt. % to about 40 wt. %, about 9 wt. % to about 40 wt. %, about 10 wt. % to about 40 wt. %, about 12 wt. % to about 40 wt. %, about 1 wt. % to about 35 wt. %, about 1 wt. % to about 30 wt. %, about 5 wt. % to about 30 wt. %, about 1 wt. % to about 25 wt. %, about 1 wt. % to about 20 wt. %, about 1 wt. % to about 15 wt. %, about 1 wt. % to about 12 wt. %, about 7 wt. % to about 15 wt. % of the total weight of the TPB composition (including additives).

Optionally, antioxidants may be included in the compositions to improve processing stability. One of skill in the art will readily recognize viable antioxidants that may be useful. One example of a suitable primary antioxidant is benzenepropanamide, N,N'-1,6-hexanediylbis[3,5-bis(1,1-dimethylethyl)-4-hydroxy (e.g., IRGANOX® 1098 available from BASF of Ludwigshafen, Germany). One example of secondary antioxidants is tris(2,4-di-tert-butylphenyl)phosphite (e.g., IRGAFOS® 168 available from BASF). A light stabilizer, which may function as an antioxidant may also be added, for example, butanedioic acid, dimethylester, polymer with 4-hydroxy-2,2,6,6-tetramethyl-1-piperidine ethanol (e.g., TINUVIN® available from BASF). The antioxidant(s) may be included in an amount of from 0.1 wt. % to 20 wt. % of the TPB composition (including additives), encompassing any value and subset therebetween. In some embodiments, the antioxidant(s) is present in an amount of between 1 wt. % and 5 wt. % of the TPB composition (including additives).

Additives other than those listed above may be incorporated into the TPB composition to control properties useful in one or more of the polymeric sheathes/layers for use in a flexible conduit/pipe (e.g., thermal conductivity, abrasion resistance, gas permeability).

As noted above, low thermal conductivity may be a desirable quality of the inner pressure sheath, insulating and outer sheath layers. Thus, a low thermal conductivity filler may be added to the TPB composition used to fabricate said layers in order to reduce the thermal conductivity of said layer. Examples of suitable low thermal conductivity fillers include aerogels, fumed silica (e.g., AEROSIL®, available from Evonik of Hanau-Wolfgang, Germany), and combinations thereof. The low-conductivity filler(s) may optionally be included in the TPB compositions for use in the conduits described herein in an amount of up to 12 phr, which also up to 10 phr, up to 8 phr, up to 6 phr, up to 4 phr, and up to 2 phr. In some embodiments, the thermal conductivity of materials formed from TPB compositions disclosed herein is lower than that of conventionally used materials. For example, as will be shown in the Examples, the thermal conductivity of a material prepared from a TPB composition containing polypropylene homopolymer and brominated isobutylene paramethyl-styrene terpolymer rubber (BIMSM) (inventive example Ex. A) was measured to be 0.135 W/mK. Syntactic foam, typically used as the insulating layer in flexible conduits, as discussed in greater detail above, has a thermal conductivity of 0.160 W/mK. Thus, some embodiments of TPB compositions exhibit improved characteristics for use in insulating layers of a flexible conduit over presently used materials in the same application. In some applications, this may enable the use of less material in fabrication such an insulating layer when compared to the use of syntactic foam, and may result in lighter conduits and cost savings. Further, manufacture of materials from such TPB compositions is simpler than manufacture from syntactic foam (i.e., can be extruded) and does not involve the crushing of glass.

To increase abrasion resistance, which may be particularly useful for the outer sheath, a material with high impact strength, such as medium density polyethylene (MDPE), high density polyethylene (HDPE) or ultra-high-molecular-weight polyethylene (UHMWPE) may be added. HDPE and/or UHMWPE may optionally be included in an amount between about 0.1 wt. % to about 20 wt. %, which includes about 1 wt. % to about 15 wt. %, about 1 wt. % to about 10 wt. %, and about 1 wt. % to about 5 wt. % of the TPB composition (including additives).

Other additives that may be useful in reducing the wear and abrasion resistance of materials prepared from the TPB compositions (e.g., external protective sheath and anti-wear intermediate layers) include perfluoropolyether (PFPE) synthetic oil (e.g., FLUOROGUARD® available from Chemours of Wilmington, Delaware), PTFE (polytetrafluoroethylene), graphite, carbon fibers, carbon nanotubes, aramid fibers, etc.

Strength may also be optionally enhanced by the addition of composite fibers (e.g., carbon-black fibers, carbon nanotubes). Composite fibers may optionally be included in TPB compositions used to fabricate any layer of a conduits in an amount of up to 20 wt. % of the TPB composition (including additives), which includes values of up to 5 wt. %, up to 10 wt. %, up to 15 wt. %, and up to 17 wt. %.

In one or more embodiments, the reinforcing fibers, which may also be referred to as chopped fibers, include natural and synthetic fibers, and may include organic and inorganic fibers. Exemplary organic fibers include polyester, polyaramid, polyethylene naphthalate (PEN), polyester-polyacrylate, polyvinylchloride, polypropylene, polyphenylene sulfide, polyetherimide, polyamide, polyimide or cellulose fibers. Exemplary inorganic fibers include glass, steel, boron, carbon fibers, or wollastonite fibers. Suitable polyaramid fibers are commercially available under the tradename TWARON™ (available from Teijin Aramind of The Netherlands, Arnhem). Suitable polyester-polyacrylate fibers are commercially available under the tradename VECTRA™ (available from Celanese of Irving, TX). Suitable polyester fibers are commercially available under the tradename INVISTA™ F211 (Available from Invista of Wichita, KS).

Optionally, cyclic olefin copolymers (COCs) may be included to increase gas permeability, decrease thermal conductivity, and/or improve moisture resistance. Thus, COC may be particularly useful when added to TPB compositions used to form insulating and outer sheath components of conduits. Examples of suitable cyclic olefin copolymers include copolymers of cyclic monomers, such as norbornene, with an α-olefin, such as ethylene. COC may be included in an amount of between about 0.1 wt. % to about 20 wt. %, which includes about 1 wt. % to about 15 wt. %, about 1 wt. % to about 10 wt. %, and about 1 wt. % to about 5 wt. % of the TPB composition (including additives). In some embodiments, the COC may have a cyclic monomer content in a range from about 30 wt. % to about 90 wt. % based on the total weight of the COC. In particular embodiments, norbornene makes up 60 wt. % to 90 wt. % of the copolymer. In some embodiments, the COC is a copolymer of norbornene and ethylene having a glass transition temperature ($T_g$) of between 60° C. and 1600° C. and a MFR from 4 mL/10 min to 50 mL/10 min at 260° C./2.16 kg. In particular embodiments, the COC is a copolymer of norbornene and ethylene having a glass transition temperature ($T_g$, as determined by differential scanning calorimetry (DSC) according to ASTME 1356) from 10° C. to 190° C. when measured at 10° C./min. In some embodiments, the COC has a $T_g$ of between 40° C. and 200° C. In some embodiments, the COC has a MFR (tested using ASTM D-1238; 2.16/kg at 260° C.) of about 1 mL/10 min to about 60 mL/10 min at 260° C./2.16 kg. In other embodiments, the COC has a MFR of about 4 mL/10 min to about 50 mL/10 min. In some embodiments the COC has a MFR of about 32 mL/10 min. In other embodiments, the COC has a MFR of about 48 mL/10 min. Specific examples of suitable COCs that are commercially available include TOPAS® COC (available from TOPAS Advanced Polymers of Farmington Hills, MI) and APEL™ (available from Mitsui Chemicals America, Inc. of Rye Brok, NY). Other useful COCs include those obtained by ring opening metathesis polymerization of cyclic monomers followed by hydrogenation, for example, ATRON® (available from JSR Corporation of Higashi-Shimbashi Minato-ku, Tokyo) and ZEONEX® (available from Zeon Corporation of San Jose, CA).

In some embodiments, the TPB composition includes a "compatibilizer," "compatibilizing agent," or a "compatibilizing composition," and the terms may be used interchangeably. In some embodiments, the compatibilizer includes a functionalized polyolefin. For example, in some embodiments, the functionalized polyolefin is a maleated polyolefin. In particular embodiments, the maleated polyolefin has a maleic anhydride (referred to here as maleic anhydride polyolefins) grafting level greater than 0.1 wt. %. In some embodiments, it is greater than 0.5 wt. %. In particularly useful embodiments, the maleic anhydride grafting level is greater than 1 wt. % with respect to the grafted polymer. Without wishing to be bound by theory, use of functionalized (e.g. maleic anhydride) polyolefins may increase the TPB polarity thereby improving the hydrocarbon fluid resistance, which is particularly beneficial in fabricating the inner (pressure) sheath. In some embodiments, use of functionalized (e.g. maleic anhydride) polyolefins may enhance the adhesion of a polymeric layer (e.g., pressure sheath, insulating layer, and/or outer protective sheath) to a metallic tensile armor. In other embodiments, use of functionalized polyolefins will help composition compatibility in embodiments where reinforcing fibers are incorporated in the TPB composition.

For example, in particular embodiments, reinforcing fibers are embedded in functionalized polyolefins having a polarity of less than 90 degrees. The term "polarity" refers to the contact angle which is defined as the slope of the tri-point at the intersection of observation plane and the drop of liquid water (which is considered polar) disposed on a surface of solid polymer (that is substantially or entirely free of surface contamination) that is disposed on a flat surface perpendicular to gravitational force. A lower contact angle indicates high polarity, whereas a high contact angle indicates low polarity. The polarity is measured with a suitable contact angle analyzer that can be obtained from AST Products, Inc. of Billerica, MA using the AutoFAST Algorithm software utilizing the Fox-Zisman Theory.

Examples of commercially-available acid anhydride polyolefins that can be used in accordance with this invention, include, but are not limited to, AMPLIFY™ GR functional polymers (available from the Dow Chemical Company), FUSABOND® polymers (available from the DuPont Company), KRATON® FG and RP polymers (available from Kraton Polymers LLC), LOTADER® polymers (available from Arkema, Inc.), POLYBOND® and ROYALTUF® polymers (available from Chemtura Corp.), and EXXELOR™ polymers (available from the ExxonMobil Corp.) In particularly useful embodiments, POLYBOND® 3000 (MAH level:1, 2 wt. %), FUSABOND® E100, AMPLIFY™ GR205, EXXELOR™ PE 1040, or EXXELOR™ PO 1015 is used.

As discussed above, TPB compositions may include optional additives that result in or achieve enhanced properties useful in the fabrication and properties of various layers of conduits/pipes. Specific examples of various methods useful for attaining such properties are described below, but are by no means exhaustive or limiting in any way. Alternative means to achieve desired properties are possible and contemplated; the disclosure below is included to merely illustrate several such contemplated methods.

As noted above, COC-containing TPB compositions may exhibit high gas permeability. For example, a gas permeability of about 10 barrers to about 200 barrers at 60° C. may be achieved in COC or hydrocarbon resin-containing TPB compositions as described herein. This range incudes about 25 barrers, about 50 barrers, about 75 barrers, about 100 barrers, about 125 barrers, about 150 barrers, and about 175 barrers, as well as values therebetween. In particularly useful embodiments, the TPB composition has between about 1 wt. % and about 10 wt. % COC. Without wishing to be bound by theory, high gas permeability is believed to be achieved by the disruption of the crystallinity of the thermoplastic matrix by the COC, having high amorphous content.

As noted above, COC-containing TPB compositions may exhibit low thermal conductivity. For example, a thermal conductivity of less than 0.3 W/mK (when measured using methods disclosed in Table 1) may be achieved. This range incudes about 0.1 W/mK to about 0.3 W/mK, as well as conductivities of 0.2 W/mK, 0.18 W/mK, 0.16 W/mK, 0.14 W/mK, 0.12 W/mK, and 0.1 W/mK. In particularly useful embodiments, the TPB composition has between about 1 wt. % and about 10 wt. % COC. Without wishing to be bound by theory, low thermal conductivity is believed to be achieved because the additive COC itself has low thermal conductivity and/or because of its amorphous nature (semi-crystalline polymers have typically higher thermal conductivity than amorphous polymers).

In addition to achieving high gas permeability, as described above, in some embodiments, TPB compositions may be tuned to achieve low gas permeability. For example, by incorporating functionalize polyolefins into a TPB composition, a gas permeability of about 0.1 barrers to about 50 barrers at 90° C. (when measured using methods disclosed above) may be achieved. This range of gas permeability includes all values within said range, including 1 barrer, 5 barrers, 10 barrers, 15 barrers, 20 barrers, 25 barrers, 30 barrers, 35 barrers, 40 barrers, and 45 barrers, as well as all ranges within, including 0.1 barrers to 8 barrers, 0.5 barrers to 8 barrers, and 1 barrers to 8 barrers. In some embodiments, the polyolefin is functionalized with maleic anhydride. In some embodiments, the functionalized polymer is maleic anhydride functionalized polypropylene. In some embodiments, the functionalized polymer is maleic anhydride functionalized high density polyethylene. In particularly useful embodiments, the TPB composition has between about 0.1 wt. % to about 20 wt. % functionalized polyolefin. In particularly useful embodiments, the TPB composition has between about 1 wt. % to about 15 wt. % or about 1 wt. % to about 10 wt. % functionalized polyolefin.

TPB compositions may be tuned to achieve a desired hardness. For example, by including COCs, materials prepared from therefrom may display increase hardness. In some embodiments, a hardness of about 60 Shore A to about 60 Shore D (when measured by ASTM D2240) may be achieved. This range of hardness includes all value within said range, including 80 Shore A to 50 Shore D. In particularly useful embodiments, the TPB composition has between about 0.1 wt. % to about 20 wt. % COC. In particularly useful embodiments, the TPB composition has between about 1 wt. % to about 15 wt. % or about 1 wt. % to about 10 wt. % COC. Without wishing to be bound by theory, increased hardness is believed to be achieved because the hardness of the COC component itself is high.

TPB compositions may be tuned to achieve increased abrasion resistance. For example, increased abrasion resistance may be achieved by adding a material with high impact strength, such as medium density polyethylene (MDPE), high density polyethylene (HDPE) or ultra-high-molecular-weight polyethylene (UHMWPE) to the TPB composition. In particularly useful embodiments, these additives are incorporated into the TPB composition at between 0.1 wt. % to about 20 wt. %, which includes about 1 wt. % to about 15 wt. %, about 1 wt. % to about 10 wt. %, and about 1 wt. % to about 5 wt. % of the TPB composition (including additives). For example, abrasion resistance of about 20 mg/cycle to about 100 mg/cycle (when measured by the method disclosed in Table 1) may be achieved using COC or hydrocarbon resin-containing TPB compositions as described herein. This range includes values of about 30 mg/cycle, about 40 mg/cycle, about 50 mg/cycle, about 60 mg/cycle, about 70 mg/cycle, about 80 mg/cycle, and about 90 mg/cycle as well as values between.

Production of Thermoplastic Blends

TPB compositions disclosed herein may be formed into pellets that may, in turn, be used to manufacture a variety of other articles, including articles that may employed as part of flexible conduit (e.g., tapes, pipes, sheath layers). Pellets may be prepared by methods well-known in the art. For example, as described in greater detail in the Examples, pellets may be formed by a process including the steps of introducing a rubber component is introduced to an extruder, introducing a thermoplastic component to the extruder, and optionally introducing any additives. Each component may be introduced upstream, downstream, or simultaneously with other components. In many embodiments, the TPB compositions disclosed herein exhibit excellent extruder processability. A skilled person in the art could chose the extruder screw design, temperature profile, screw speed and other conditions to optimize the extruder processability of the TPB composition without undue experimentation.

In some embodiments, one or more additives is introduced at one or more times (or locations) during the single-step process. That is, an additive may be added upstream, downstream, or simultaneously with the various components of the composition that is pelletized to form the pellets. The addition of the second additive oil, for example, may be more or less than the first additive oil and may be used, for instance, to further enhance processability of one or more components of the pellet.

In some embodiments, additional additive oil is introduced into the extruder. This additive oil may be introduced in order to further the processability of the pellet as well as improve the processability of the pellet during fabrication into a desired article (e.g., insulating layer, outer sheath), for example.

The composition (i.e., after extrusion from the extruder die) is then pelletized (e.g., in series by use of an underwater pelletizer or separately after extrusion, such as by a strand cut pelletizer) to form pellets. The extruder may be, for example, a twin screw extruder or a single screw extruder. Moreover, in one or any embodiments, the extruder may further include a melt pump, such as a HENSCHEL™ melt pump, supplied by Henschel GmbH, Kassel, Germany. The palletization may be achieved using any method known to those of skill in the art, including manual palletization or use of a pelletizing unit (e.g., a strand cut pelletizer or an underwater pelletizer).

The pelleted TPB compositions of the present disclosure may be extruded, compression molded, blow molded, injection molded, and/or laminated into various shapes for use in the flexible conduits of the present disclosure, whether forming a single continuous layer or provided in discontinuous segments. Such shapes may include, but are not limited to, layers (e.g., extruded layers) of various thicknesses, tapes, strips, castings, moldings, and the like for providing an outer protective sheath and/or thermally insulating layer and/or pressure layer to the conduits described herein. In some embodiments, a TPB composition configured for use as at least a portion of a conduit may have a wall thickness (i.e., a layer thickness, where multiple layers may be used) in the range of from 0.5 millimeters (mm) to 50 mm, encompassing any value and subset therebetween. The particular thickness may depend on one or more factors, including the particular application requirement for the TPB composition as part of the conduit (e.g., whether it is provided in the outer protective layer or a thermally insulating layer).

In some embodiments, TPB compositions described herein may be used to form articles made by extrusion and/or co-extrusion, blow molding, injection molding, thermo-forming, elasto-welding, compression molding, 3D printing, pultrusion, and other suitable fabrication techniques. In some embodiments, TPB compositions disclosed herein may be used to form flexible pipes, tubing, hoses, and flexible structures, such as flexible subsea pipes, flow lines, and flexible subsea umbilicals used in transporting fluids in petroleum production. The flexible structures can transport hydrocarbons extracted from an offshore deposit and/or can transport water, heated fluids, and/or chemicals injected into the formation in order to increase the production of hydrocarbons. In yet other embodiments, TPB compositions disclosed herein may be used to form the outer covering of a thermoplastic composite pipe.

Conduits

The conduits (i.e., pipes) described herein may include various layers, any of which may have a thermally insulating layer incorporated therewith, therebetween, and the like, anti-wear as well as an outer protective sheath. For example, flexible conduits may include polymeric, metallic, and composite layers, where a thermally insulating layer is located, for example, beneath the outer protective sheath. Steel conduits may include an outer protective layer that itself services as a thermally insulating layer (i.e., the outer protective layer and the thermally insulating layer are one and the same). In other instances, the steel conduit may be a pipe-in-pipe conduit (e.g., a first pipe is nested within a second pipe), the thermally insulating layer may be located in the annulus between the two pipes.

In some embodiments, a conduit may have the general structure shown in FIG. 1, having multiple layers. Inner tube 5 has a cannel or bore formed therethrough for the flow of hydrocarbons (e.g., oil and/or gas) and additional components therewith (e.g., water). The inner tube 5 may be made of a flexible material, including a helically wound flat or profiled metallic strips to provide collapse resistance, or alternatively may be composed of steel or other metal. In some instances, inner tube 5 may be composed of PVDF (e.g., for high temperature and pressure use), or crosslinked polyethylene and Nylon PA11 and/or Nylon PA12 (e.g., for mind temperature and pressure use), or HDPE (e.g., for low temperature and pressure use). Reinforcing layer 4 provides additional strength to the conduit, and may be made of any metal or layers of metals, or alternatively a reinforced polymer (e.g., carbon nanotube reinforced PVDF, the TPB compositions disclosed herein reinforced with carbon nanotubes). Thermally insulating layer 3, as shown in FIG. 1, provides thermal insulation to the conduit and is composed of the TPB composition disclosed herein (whereas, traditionally, it would be formed of syntactic polypropylene foam). As shown, thermally insulating layer 3 is located exterior to reinforcing layer 4. Alternatively or in addition, thermally insulating layer 3 may be located outer to inner tube 5 (e.g., between inner tube 5 and reinforcing layer 4), without departing from the scope of the present disclosure. Tensile layer 2 is optional, but if included in the conduit, provides resistance to tensile, torsional, and flexural stresses. Outer protective sheath 1 (or outer layer 1) prevents ingress of surrounding fluids (e.g., seawater) and protects against mechanical damage. Outer protective sheath 1 may be fabricated from a polymeric material, such as HDPE, or may itself be a thermally insulating layer fabricated from the TPB composition of the present disclosure.

Figure 2:
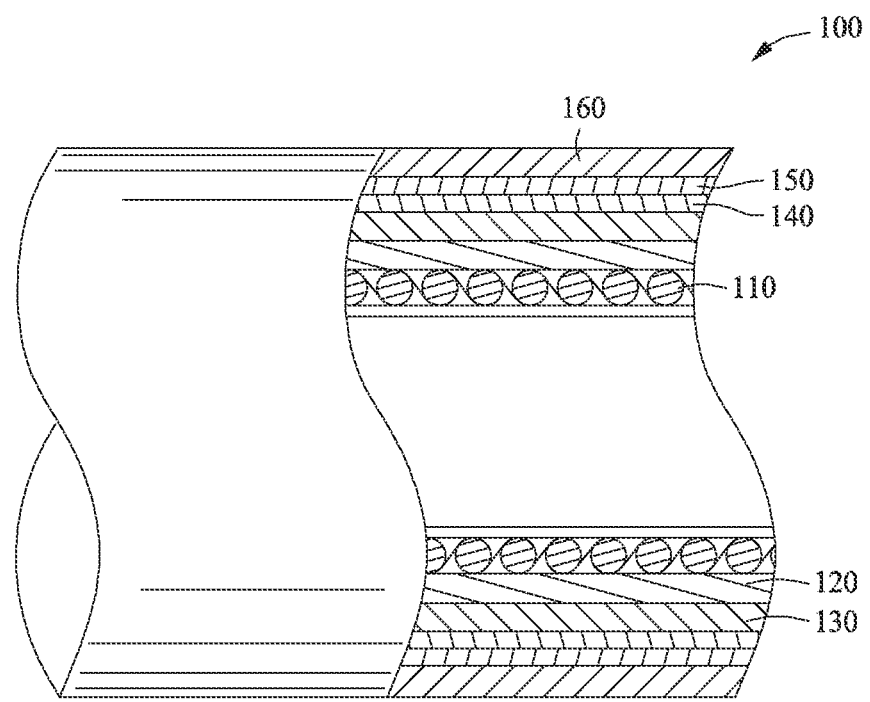
FIG. 2 is a view of a conduit according to one or more embodiments of the present disclosure.

Referring now to FIG. 2, illustrated is another conduit that may employ TPB compositions disclosed herein. As shown, conduit 100 (which as represented is a flexible conduit) includes an inner tube 110 having a channel or bore formed therethrough. The tube 110 is made of a flexible material and includes a helically wound flat or profiled metallic strips to provide collapse resistance. A polymeric sheath 120 is at least partially disposed or wrapped around the tube 110 for containing the fluid in the pipe. The sheath 120 is preferably made of an impervious polymeric material. A layer 130 is at least partially disposed or wrapped around the layer 120 and provides resistance to internal pressure, hydrostatic collapse, and crush. The layer 130 can be formed by helically wrapping a continuous metallic strip, preferably formed of carbon steel, with adjacent windings being interlocked, to form a flexible layer that provides significant hoop and axial strength, such as FLEXLOK™ (available from Wellstream, Inc., Newcastle upon Tyne, United Kingdom). A tensile layer 140 is at least partially disposed or wrapped around the layer 130 and includes at least one tensile reinforcement element that is wound to resist the hoop stress, the axial component of the internal pressure, and the axial load due to the weight of the suspended pipe and exterior effects. A thermally insulating layer 150 surrounds the tensile layer 140, for example by extrusion, and may be formed from one of many embodiments of a TPB composition described herein. An outer protective sheath 160 is at least partially disposed or otherwise formed over the outer tensile layer 150. The sheath 160 may be fabricated from a TPB composition described herein. In some embodiments, the thermally insulating layer 150 is the same or different composition as the outer protective sheath 160.

Although not shown in the drawings, one or more adhesive layers may be provided between any of the layers 110, 120, 130, 140, and 150 of FIG. 2 (or layers 1, 2, 3, 4, and 5 of FIG. 1). In some embodiments, the present disclosure provides a conduit/pipe. In some embodiments, this pipe is flexible. Conduits/pipes of the type described above include an outer protective sheath and/or a thermally insulating layer and/or an inner pressure sheath made from a TPB composition containing: (i) a dispersed phase having at least one uncured rubber component and (ii) a continuous phase having at least one thermoplastic component. In particularly useful embodiments, the uncured rubber of the dispersed phase contains a butyl rubber component or an ethylene-propylene rubber component and the at least one thermoplastic component of the continuous phase contains polypropylene. In some embodiments, the at least one thermoplastic component of the continuous phase further contains a homopolymer, random copolymer, or impact copolymer of polypropylene. In some embodiments, the polypropylene is a high melt strength long chain branched polypropylene homopolymer. In one or more embodiments, the polypropylene component of the thermoplastic phase of the TPB composition may have a $M_w$ of from about 100 kg/mole to about 1000 kg/mole, from about 400 kg/mole to 800 kg/mole, any value encompassed therein, as well as any subset therebetween. This polypropylene may be characterized by a MFR of about 0.1 g/10 min to about 10 g/10 min, which includes from about 0.5 g/10 min to about 30 g/10 min, any value encompassed therein, as well as any subset therebetween.

In some embodiments of the present disclosure, the TPB composition includes a butyl rubber component, such as, but not limited to, IIR, BIIR, BIMSM, or combinations thereof. In some embodiments, the TPB composition includes an olefin elastomer, such as such as EPDM or an ethylene-α-olefin-vinyl norbornene rubber. In some embodiments, the TPB composition includes both an olefin elastomer and a butyl rubber component. In some embodiments, the TPB composition includes a propylene-based polymer, such as polypropylene homopolymer, polypropylene random copolymer, or impact copolymer polypropylene.

The outer protective sheath and/or the thermally insulating layer formed from the TPB compositions described herein may be formed by extrusion onto the underlying layer, for example, the at least one reinforcing layer, or the inner tube, or the tensile layer. Generally, the outer protective sheath and/or thermally insulating layer is non-filled; that is, it does not contain hollow spheres of glass or other frangible material.

Processes of the present disclosure may be used for the production of any one of the polymer layers of a flexible offshore pipe (e.g. pressure sheath, insulation layer, outer protective sheath) and most preferably for the insulation layer and the outer protective sheath. Polymer layers include one or more TPB compositions described herein. These polymer layers may be in the shape of a tube (e.g., "tubular"). A flexible offshore pipe is also denoted as an unbonded pipe, which means that the pipe includes two or more layers which are not bonded along their entire length so that the individual layers can slide with respect to each other. This feature gives the offshore pipe high flexibility. Flexible subsea (or submarine) pipes/conduits in which the TPB compositions disclosed herein may be used typically (but are not required to) include, from the outside inwards, an outer polymeric sealing sheath, at least one layer of tensile armor (usually two), a pressure vault, an internal sealing sheath polymer, optionally a metal carcass, and optionally one or more cladding (s) polymer (s) intermediate seal (s) between two adjacent layers, wherein that at least one of these layers is manufactured from, includes, or has a TPB composition as described herein.

Flexible subsea (or submarine) pipes/conduits may include other layers in addition to those mentioned above. For example, they may additionally include a) a collar carried by the short-pitch winding of at least one advantageously cross-sectional wire around the pressure vault to increase the resistance to the pipe bursting, a retaining layer such as a high strength aramid strip (e.g., TECHNORA® or KEVLAR®) between the outer polymeric sheath and the tensile armor plies or between two tensile armor plies, b) an anti-wear layer of polymeric material (such as plasticized polyamide or a TPB composition, disclosed herein) not in contact either with the inner face, the outer face, or neither face of a retaining layer, or c) any combination thereof.

Anti-wear layers, which are well known to those skilled in the art, are generally composed of helically wound strip/s (one or more) obtained by extrusion of a polymeric material (which may be a polyamide, polyolefin, PVDF, or a cured or uncured TPB composition). WO2006/120320 discloses other materials suitable for anti-wear layers.

Layers of the flexible subsea (or submarine) pipes/conduits described herein, particularly those containing TPB compositions disclosed herein, may be useful for or adapted to function as a seal (e.g., sealing sleeve), for example, to avoid leakage of hydrocarbons through cracks or blisters formed over time and/or for preventing entry of sea water into the pipe. For example, the flexible pipe of the invention may contain, from the outside inwards: an outer polymeric sheath sealing (optionally being formed from a TPB composition described herein), at least one ply of tensile armor, a pressure vault, a polymeric sheath internal seal (optionally being formed from a TPB composition described herein), and optionally a metal carcass.

Articles and uses for the TPB composition described in this invention can be in the form of a monolayer film, multilayer film, monolayer sheet, multilayer sheet, monolayer tape, monolayer taper and receptacles (e.g., containers and casings).

Certain embodiments of the present disclosure include flexible pipes/conduits comprising polymeric sheaths, comprising the TPB composition described herein, positioned as inner, intermediate, or outer layers of: 1) unbonded or bonded flexible pipes, tubes, and hoses similar to those described in and in accordance with the specifications set forth in API Spec 17J and API Spec 17K (each of which is incorporated herein by reference), 2) thermoplastic umbilical hoses similar to those described in and in accordance with the specifications set forth in API 17E (which is incorporated herein by reference), or 3) thermoplastic composite pipes similar to those described in and in accordance with the specifications set forth in DNV RP F119 (which is incorporated herein by reference). In other embodiments, TPB composition as disclosed herein may be used in composite tapes (e.g., tapes of carbon fibers, carbon nanotubes, or glass fibers embedded in a thermoplastic matrix) used in thermoplastic composite pipes similar to those described in DNV RP F119.

To facilitate a better understanding of the various embodiments of the present invention, the following examples of preferred or representative embodiments are given. In no way should the following examples be read to limit, or to define, the scope of the disclosure.

EXAMPLES

Several TPB compositions as disclosed herein were prepared by the methods disclosed herein to exemplify properties that may be allow for their use in flexible conduits suitable for oil/gas transport in the extreme environments as discussed in the background section of the present disclosure. For purposes of convenience, the various specific test procedures used in the examples described hereinbelow are identified in Table 1. It is to be understood that a person of ordinary skill in the art may use various other published or well-recognized test methods to determine a particular property of the TPB compositions described herein for use in a flexible or steel conduit, without departing from the scope of the present disclosure, although the specifically identified procedures are preferred. Each claim should be construed to cover the results of any of such procedures, even to the extent different procedures may yield different results or measurement values.

TABLE 1

| Property | Test |
| --- | --- |
| Thermal Conductivity | ASTM C518 (using a FOX50-190 heat flow meter, TA Instruments, New Castle, DE) |
| Specific Gravity | ASTM D792 |
| Tensile Properties | ISO 37 and ISO 527 (above 40 D) |
| Hardness | ASTM D2240 |
| Surface Roughness | SURFTEST ™ SJ-500P Series Tester |
| Flexural Properties | ASTM D790 |
| Creep | See disclosure below |
| Gas ($CO_2$) Permeability | ISO 2782-1 at 60° C. or 90° C. in units of barrers |
| Abrasion Resistance | ASTM D4060 |

$CO_2$ gas permeability was measured according to ISO 2782-1: 2012(E) in which the thickness of each sample was measured at 5 points homogeneously distributed over the sample permeation area. The test specimen was bonded onto the holders with suitable adhesive cured at the test temperature. The chamber was evacuated by pulling vacuum on both sides of the film. The high pressure side of the film was exposed to the test pressure with $CO_2$ gas at 60° C. The test pressure and temperature was maintained for the length of the test, recording temperature and pressure at regular intervals. The sample was left under pressure until steady state permeation has been achieved (3-5 times the time lag (t)). The diffusion coefficient and solubility coefficient was estimated from the lag time according to the following equation, where l is thickness of the sample:

$$\text{Permeability coefficient}(P) = \text{Diffusion coefficient}(D) \times \text{Solubility}(S)$$

$$D = \frac{l^2}{6\tau}.$$

Abrasion loss was measured according to ASTM D4060-14 in which the method was performed on both sides of a 4" circular specimen cut from the plaques provided. Wheel H-22 was used with 1 kg weight and 1000 revolutions. The wheel was resurfaced before testing each specimen (or after every 1000 cycles).

Creep strain was measured by conditioning the test samples according to ASTM Lab conditions at 23±2° C. and 50±10% relative humidity. Conditioning time was not less than 40 hours under lab conditions and was not less than 48 hours after fabrication. Strips with dimensions of 15 mm width×250 mm length (0.591" wide by 9.85" long) were cut from compression molded sheet samples. The test area 100 mm was clamped and loaded with weights to achieve a total stress of 4 MPa. The creep strain was measured as a function of time for a week at 23° C.

The examples hereinbelow are directed to TPB compositions for use in flexible or steel conduits as the outer protective sheath and/or one or more thermal insulating layers and/or an inner pressure sheath.

Example 1

As disclosed herein, said TPB compositions include an uncured rubber/elastomer component and a thermoplastic component. Said TPB composition also may contain a plasticizer and a filler. Table 2 below illustrates two exemplary TPB compositions of the present disclosure containing an uncured rubber/elastomer component, a thermoplastic component, and a filler, and plasticizer. Neither composition was subjected to any curing agent. The compositions were made on a co-rotating, fully intermeshing type 53 mm twin screw extruder, supplied by Coperion Corporation, Ramsey NJ, with a procedure similar to that described in U.S. Pat. No. 4,594,391 and US 2011/0028637.

TABLE 2

| Raw Material | Component | Ex. A (phr) | Ex. B (phr) |
| --- | --- | --- | --- |
| EXXPRO ® 3745 | Rubber/elastomer (BIMSM) | 100.00 | 100.00 |
| PP5341 | Thermoplastic polymer (polypropylene homopolymer) | 164.00 | 280.00 |
| VISTAMAXX ® 6102 | Polyolefin (propylene-based) | | 3.00 |
| Icecap clay | Filler | 5.00 | 5.00 |
| INDOPOL ® H-8 | Plasticizer | 64.30 | |
| ParaLux Oil | Plasticizer | | 12.00 |
| IRGANOX ® 3114 | Antioxidant | 1.00 | 1.00 |
| IRGAFOS ® 168 | Antioxidant | 2.00 | 2.00 |
| TINUVIN ® 622F | Light Stabilizer/Antioxidant | 2.00 | 2.00 |
| | TOTAL | 338.30 | 405.00 |

Comparative Examples C-A and C-B

Comparative examples C-A and C-B are materials used as one or more layers in currently available flexible pipes for fluid transportation in petroleum production described in the "Articles" section. Comparative example C-A is a polyamide resin under the product name PA11 BESNO P40 TL available from Arkema of King of Prussia, PA Comparative example C-B is a copolymer under the product name ELTEX® TUB121 available from Ineos Olefins & Polymers USA located in League City, TX Comparative example C-A and comparative example C-B were tested on injection molded samples. Table 3 sets forth the results of physical testing that was performed on each sample.

TABLE 3

Comparative Examples of Materials Used in Currently Used in Flexible Pipes for Petroleum Production

|  | C-A (Polyamide) | C-B (Copolymer) |
|---|---|---|
| Stress @ 7%, MPa | 15.6 | 22.9 |
| Yield Strength, MPa | 25.3 | 23.2 |
| Yield Strain, % | 50.7 | 9.4 |
| $CO_2$ Gas Permeability (@ 60° C.) | 6.1 | 9.1 |
| Abrasion loss, mg/1000 cycle | 33.5 | 50.0 |
| Thermal conductivity, W/mK | 0.248 | 0.381 |
| Creep strain (@ 23° C., 4 MPa) after 1 week, % | 4 | 2 |

The thermal conductivity of TPB (with no cure) composition Ex. A was measured to be 0.135 W/(mK), while that of the comparative incumbent material used for insulation (syntactic foam) is 0.160 W/(mK). This will allow reduction of the insulation layer thickness of the case of the exemplary compositions Ex. A vs. syntactic polypropylene foam resulting in material cost savings and pipe light weighting. The exemplary TPB compositions are believed to avoid the issue of crushing and reduction of layer thickness over time when compared to syntactic foam, as well as improved processability. The comparative example of polypropylene syntactic foam is a common material (a composite of hollow glass beads in a polypropylene matrix) used for the thermal insulation layer of flexible pipes used for oil and gas applications that is commercially available by Trelleborg (e.g. VIKOTHERM™ PT polypropylene syntactic foam in the form of tapes) suitable for deep sea applications.

Example 2

Properties such as strength, hardness, and modulus are often achieved through curing/vulcanization, however, similar properties are achieved with the uncured TPB compositions disclosed herein. Table 3 below contrasts properties of a conventional vulcanized composition (C5) against five uncured TPB compositions (E14-E18) having similar components.

TABLE 4

| Raw Material | Component | C5 | E14 | E15 | E16 | E17 | E18 |
|---|---|---|---|---|---|---|---|
|  |  | \multicolumn{6}{c}{Composition (parts by weight)} | | | | | |
| EPDM(E)-1 | Elastomer |  |  | 175 |  |  |  |
| EPDM(V)-1 | Elastomer | 200 | 200 |  | 200 | 200 | 200 |
| Braskem F008F (Polypropylene homopolymer) | Polyolefin | 515.4 | 490.4 | 451 |  |  | 461 |
| PDH025 | Polyolefin |  |  |  | 490.4 |  |  |
| HD7800 | Polyolefin |  |  |  |  | 490.4 |  |
| INTUNE™ D5535 | Compatibilizer |  |  |  |  |  | 36.9 |
| HMB-0221 | Slip Agent |  | 25 |  | 25 | 25 | 25 |
| Icecap Clay | Filler | 12 | 12 | 42 | 12 | 12 | 12 |
| XIAMETER® OFX-5084 Si—H | Curing Agents | 2.5 |  |  |  |  |  |
| Pt catalyst (PC0985) |  | 0.007123 |  |  |  |  |  |
| Calcium stearate/IRGANOX® B4329 | Antioxidant | 1.59 | 1.59 |  |  |  |  |
| Zinc Oxide | Acid scavenger/heat stabilizer | 2 | 2 | 2 | 2 | 2 | 2 |
| PARAMOUNT™ 6001R | Plasticizer | 61 | 61 | 49.32 | 23.61 | 23.61 | 23.61 |
| \multicolumn{8}{c}{Properties} | | | | | | | |
| Hardness, Shore D |  | 46 | 45 | 47 | 48 | 39 | 46 |
| Stress @ 7%, MPa |  | 11.4 | 9.4 | 11.6 | 12.2 | 8.6 | 12.0 |
| Young's Modulus |  | 384 | 347 | 488 | 611 | 394 | 593 |
| Yield Strength |  | 14.0 | 11.6 | 13.3 | 12.5 | 9.9 | 12.7 |
| Yield Strain |  | 29.7 | 25.2 | 20.6 | 10.8 | 22.4 | 12.0 |
| Abrasion loss, mg/1000 cycle |  | 70 | 37 | 91 | 44 | 26 | 53 |
| Thermal conductivity, W/mK |  | 0.188 | 0.181 | 0.188 | 0.193 | 0.294 | 0.191 |
| Creep strain @ 23° C., 4 MPa, after 1 week, % |  | 10 | 11 | 8 | 6 | 30 | 5 |
| $CO_2$ permeability(d) 60° C., barrers |  | 72 | 65 | 70 | 61 | 41 | 66 |

Sample Preparation Using a Brabender Mixer

Preparation of examples in Table 4 was carried out under nitrogen in a laboratory Brabender-Plasticorder (model EPL-V5502). The mixing bowls had a capacity of 85 ml with the cam-type rotors employed. The plastic was initially added to the mixing bowl that was heated to 180° C. and at 100 rpm rotor speed. After plastic melting (2 minutes), the rubber, inorganic additives, and processing oil were packed into the mixer. In case, of TPV comparative examples (e.g. C5), after homogenization of the molten polymer composition (in 3-4 minute a steady torque was obtained), the curative was added to the mix, which caused a rise in the motor torque. For the E14, E15, E16, E17, and E18 examples (TPB compositions), no curative was added and the mixture was allowed to homogenize for 3-4 minutes.

Mixing was continued for about 4 more minutes, after which the molten composition was removed from the mixer and pressed (still hot) between Teflon plates into a sheet which was cooled, cut-up, and compression molded at about 400° F. A Wabash press, model 12-1212-2 TMB, was used for compression molding, with 4.5"×4.5"×0.06" mold cavity dimensions in a 4-cavity Teflon-coated mold. Material in the mold was initially preheated at about 400° F. (204.4° C.) for about 2-2.5 minutes at a 2-ton pressure on a 4" ram, after which the pressure was increased to 10 tons, and heating was continued for about 2-2.5 minutes. The mold platens were then cooled with water and the mold pressure was released after cooling (140° F.). Dogbone samples were cut out of the molded (aged at room temperature for 24 hours) plaque for tensile testing (0.16" width, 1.1" test length (not including tabs at end)).

We claim:

1. A flexible conduit useful in the production of hydrocarbon fluid comprising:
   a. at least one pressure sheath;
   b. at least one reinforcing layer;
   c. an outer protective sheath; and
   d. a thermal insulating layer, wherein the thermal insulating layer is between the pressure sheath and the outer protective sheath,
   wherein at least one of the pressure sheath and the outer protective sheath comprises a thermoplastic blend (TPB) composition comprising: (i) a dispersed phase comprising uncured elastomer component, and (ii) a continuous phase comprising a thermoplastic component; and
   wherein the thermal insulating layer comprises a second TPB composition comprising: (i) a second dispersed phase comprising a second uncured elastomer component, and (ii) a second continuous phase comprising a second thermoplastic component.

2. The flexible conduit of claim 1, wherein each uncured elastomer component independently comprises a material selected from the group consisting of an olefinic elastomeric copolymer, a butyl rubber, natural rubber, acrylic rubber, nitrile rubber, ethyl vinyl acetate, polyisobutylene (PIB), and any combination thereof.

3. The flexible conduit of claim 2, wherein the acrylic rubber is an acrylic acid-ester copolymer rubber.

4. The flexible conduit of claim 2, wherein the nitrile rubber is hydrogenated nitrile rubber, carboxylated nitrile rubber, or a combination thereof.

5. The flexible conduit of claim 2, wherein the uncured elastomer component comprises ethylene vinyl acetate rubber.

6. The flexible conduit of claim 2, wherein the butyl rubber is selected from the group consisting of an isobutylene-isoprene rubber (IIR), a bromoisobutylene-isoprene rubber (BIIR), a brominated isobutylene paramethyl-styrene terpolymer rubber (BIMSM), and any combination thereof.

7. The flexible conduit of claim 1, wherein each thermoplastic component comprises a polar thermoplastic.

8. The flexible conduit of claim 1, wherein each thermoplastic component comprises a polymer of one or more olefin monomer having 2 to 7 carbon atoms.

9. The flexible conduit of claim 8, wherein the polymer comprises ethylene.

10. The flexible conduit of claim 9, wherein polymer is a differentiated polyethylene copolymer.

11. The flexible conduit of claim 8, wherein the polymer is functionalized.

12. The flexible conduit of claim 11, where in the polymer is functionalized with maleic anhydride.

13. The flexible conduit of claim 1, wherein the TPB composition further comprises a low thermal conductivity additive selected from the group consisting of aerogels, fumed silica, and mixtures thereof.

14. The flexible conduit of claim 1, wherein the TPB composition further comprises a cyclic olefin copolymer (COC) or hydrocarbon resin.

15. The flexible conduit of claim 1, further comprising a compatibilizing agent.

16. The flexible conduit of claim 1, wherein the TPB composition further comprises a plasticizer selected from the group consisting of paraffin oils, aromatic oils, naphthenic oils, synthetic oils, oligomeric plasticizers, and mixtures thereof.

17. The flexible conduit of claim 1, wherein the TPB composition further comprises MDPE, HDPE, or UHMWPE.

18. The flexible conduit of claim 1, wherein at least one of the TPB composition exhibits at least one of the following properties when measured by methods in Table 1:
   a. a thermal conductivity in the range from about 0.10 to about 0.30 W/mK (as measured using ASTM C518-17 (2017));
   b. an abrasion resistance of less than 100 mg/1000 cycle (as measured using ASTM D4060-14 (2015)); and
   c. a $CO_2$ gas permeability of 10 barrers or more as measured by ISO 2782-1 (2006).

19. The flexible conduit of claim 1, wherein the TPB composition has a $CO_2$ gas permeability of 20 barrers or more as measured by ISO 2782-1 (2006) as disclosed in Table 1.

20. The flexible conduit of claim 1, wherein the TPB composition has a $CO_2$ gas permeability of 0.1 barrers to 8 barrers as measured by ISO 2782-1 (2006) as disclosed in Table 1.

21. The flexible conduit of claim 1, wherein the TPB composition has a hardness in the range of 60 Shore A to 60 Shore D as measured using ASTM D2240-15e1 (2017).

22. The flexible conduit of claim 1, wherein the conduit is an unbonded flexible pipe.

* * * * *